(12) United States Patent
Yerramalli et al.

(10) Patent No.: US 11,653,345 B2
(45) Date of Patent: May 16, 2023

(54) BEAM SELECTION CRITERIA FOR SINGLE CARRIER WAVEFORM

(71) Applicant: QUALCOMM Incorporated, San Diego, CA (US)

(72) Inventors: Srinivas Yerramalli, San Diego, CA (US); Arumugam Chendamarai Kannan, San Diego, CA (US); Xiaoxia Zhang, San Diego, CA (US); Vinay Chande, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/029,469

(22) Filed: Sep. 23, 2020

(65) Prior Publication Data

US 2021/0092723 A1    Mar. 25, 2021

Related U.S. Application Data

(60) Provisional application No. 62/905,254, filed on Sep. 24, 2019.

(51) Int. Cl.
*H04W 72/04* (2009.01)
*H04W 72/044* (2023.01)
*H04L 5/00* (2006.01)

(52) U.S. Cl.
CPC ......... *H04W 72/046* (2013.01); *H04L 5/0048* (2013.01)

(58) Field of Classification Search
CPC .......................... H04W 72/046; H04L 5/0048
See application file for complete search history.

(56) References Cited

U.S. PATENT DOCUMENTS

| | | | |
|---|---|---|---|
| 10,425,138 B2 * | 9/2019 | Islam | H04B 7/0456 |
| 10,812,125 B1 * | 10/2020 | Badic | H04B 7/0408 |
| 2008/0069058 A1 | 3/2008 | Geng et al. | |
| 2013/0315321 A1 | 11/2013 | Rajagopal et al. | |
| 2014/0314167 A1 | 10/2014 | Jeong et al. | |
| 2019/0150133 A1 | 5/2019 | Li et al. | |

OTHER PUBLICATIONS

International Search Report and Written Opinion—PCT/US2020/052400—ISA/EPO—dated Dec. 18, 2020.

* cited by examiner

*Primary Examiner* — Justin T Van Roie
(74) *Attorney, Agent, or Firm* — Seyfarth Shaw LLP

(57) ABSTRACT

This disclosure provides systems, methods and apparatus, including computer programs encoded on computer storage media, for selecting a beam to be allocated for transmitting downlink (DL) data to user equipment (UE). In some implementations, a UE receives a reference signal on each of a number of beams associated with a base station, and determines a delay spread value for each beam. The UE identifies each beam for which the determined channel delay spread value is less than a threshold value, and determines a reference signal received power (RSRP) level for each identified beam. The UE transmits an indication of the determined RSRP levels of the identified beams to the base station, and receives, in response to the transmitted indication, a selection of the beam to be allocated for DL transmissions to the UE.

17 Claims, 14 Drawing Sheets

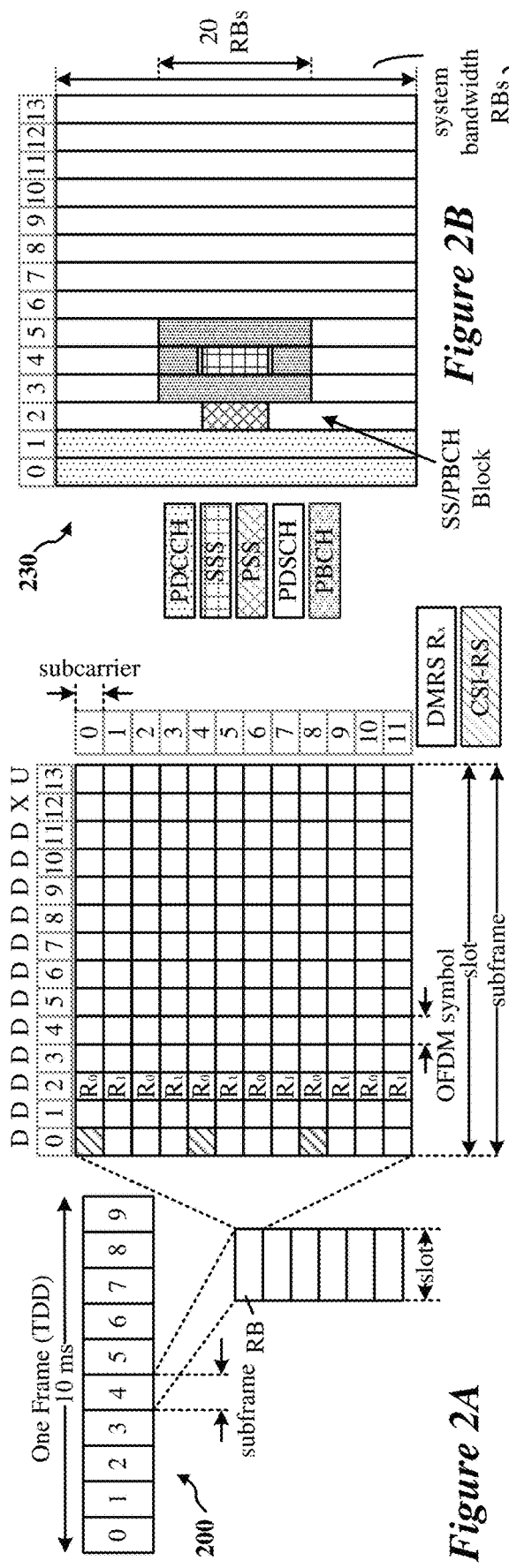
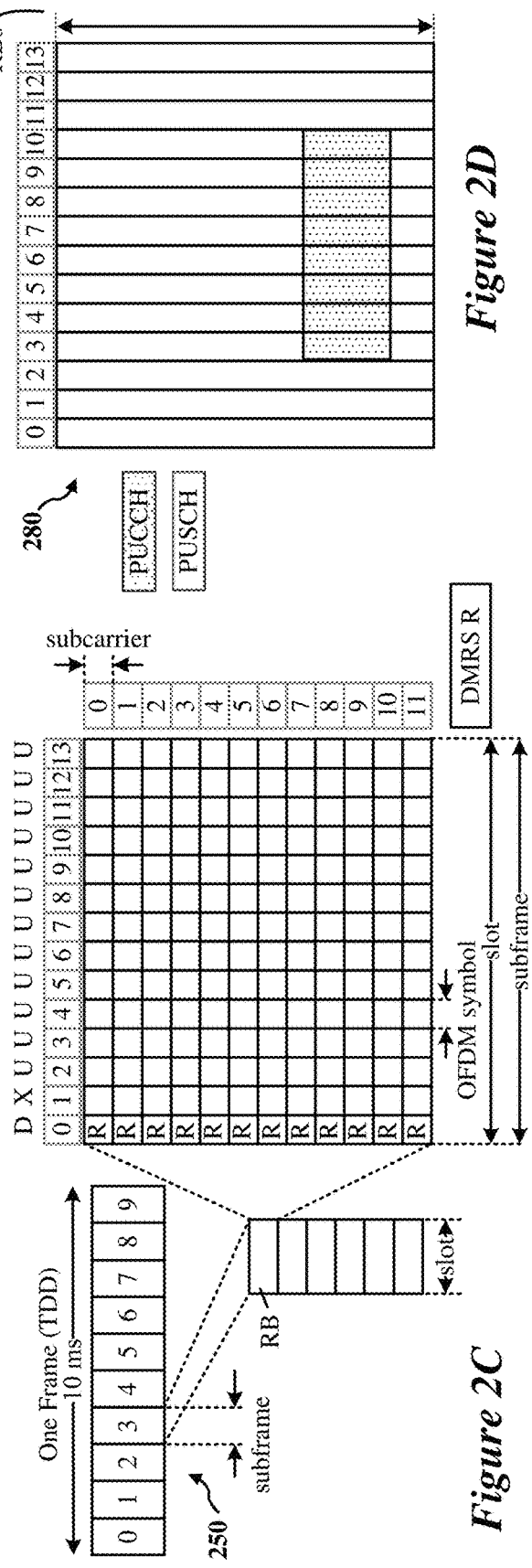

800

802

Receive DL data from the base station on the selected beam.

Transmit, to the base station, capability information of the equalizer used by the UE for equalizing channel delay spread of data transmissions received from the base station.

Select one of Time-Domain Equalizer (TDE) or a Frequency-Domain Equalizer (FDE) for equalizing channel delay spread of DL transmissions to the UE based at least in part on a transmission bandwidth of a DL channel between the base station and the UE.

824

Transmit the selection of the TDE or the FDE to the base station.

1032
Select one of a time-domain equalizer (TDE) or a frequency-domain equalizer (FDE) for equalizing the channel delay spread of DL transmissions from the base station.

1034
Transmit an indication of the selection of the TDE or FDE to the base station.

1102
Receive a reference signal on each of a number of beams associated with a base station.

1104
Determine a signal-to-interference-plus-noise ratio (SINR) value for each beam of the number of beams.

1106
Transmit an indication of the determined SINR values to the base station.

1108
Receive, in response to the transmitted indication, a selection of one beam of the number of beams to be allocated for downlink (DL) transmissions to the UE.

*Figure 11*

BEAM SELECTION CRITERIA FOR SINGLE CARRIER WAVEFORM

CROSS-REFERENCE TO RELATED APPLICATIONS

The Patent Application claims priority to U.S. Provisional Patent Application No. 62/905,254 entitled "BEAM SELECTION CRITERIA FOR SINGLE CARRIER WAVEFORM" and filed on Sep. 24, 2019, which is assigned to the assignee hereof. The disclosures of all prior Applications are considered part of and are incorporated by reference in this Patent Application.

TECHNICAL FIELD

The present disclosure relates generally to wireless communication systems, and more particularly, to selecting one or more beams for transmitting data to user equipment.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). There exists a need for further improvements in 5G NR technology.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. In some implementations, the method may be performed by a user equipment (UE), and may include receiving a reference signal on each of a number of beams associated with a base station, and determining a delay spread value for each beam of the number of beams. The reference signal may be one of a channel state information reference signal (CSI-RS), a cell specific reference signal (CRS), a demodulation reference signal (DMRS), a beamforming reference signal (BRS), a beamforming measurement reference signal (MRS), or a sounding reference signal (SRS). The method may also include identifying each beam of the number of beams for which the determined delay spread value is less than a threshold value. In some instances, the UE may receive an indication of the threshold value in a radio resource control (RRC) configuration or a downlink control information (DCI) message. In other instances, the UE may select the threshold value, and/or may transmit the selected threshold value to the base station in an uplink control information (UCI) message or a medium access control (MAC) control element (MAC-CE).

In some implementations, the method may include determining a reference signal received power (RSRP) level for each identified beam, and transmitting an indication of the determined RSRP levels of the identified beams to the base station. In some instances, the indication of the determined RSRP levels of the identified beams may be carried in a UCI or a MAC-CE. The method may also include receiving, in response to the transmitted indication, a selection of one beam of the number of beams to be allocated for downlink (DL) transmissions to the UE. In various implementations, the selection of the one beam may be based at least in part on the determined RSRP levels of the identified beams.

In some implementations, the method may also include receiving DL data from the base station as a single-carrier transmission on the selected beam. In some instances, the single-carrier transmission may occupy a frequency sub-band in the millimeter-wave frequency spectrum. In some other instances, the selected beam may be associated with a DL channel including, for example, a physical downlink shared channel (PDSCH) or a physical downlink control channel (PDCCH).

In various implementations, the threshold value may be based at least in part on capability information of an equalizer used by the UE to equalize channel delay spread of data transmissions received from the base station. In some instances, the selection of the beam may be further based on the capability information of the equalizer. The capability information may indicate at least one of a number of available taps of the equalizer or whether the equalizer is a time-domain equalizer or a frequency-domain equalizer.

In some implementations, the method may also include selecting one of a time-domain equalizer or a frequency-domain equalizer to use for equalizing channel delay spread of data transmissions received from the base station, and transmitting an indication of the selection of the time-domain equalizer or the frequency-domain equalizer to the base station. The indication of the selection of the time-domain equalizer or the frequency-domain equalizer may be carried in a UCI message or a MAC-CE. In some instances, selecting the time-domain equalizer or the frequency-domain equalizer may be based at least in part on one or more of a transmission bandwidth, a configured modulation and coding scheme (MCS), or a determination that the UE is to receive DL data from multiple transmit-reception points (TRPs).

Another innovative aspect of the subject matter described in this disclosure can be implemented in a UE. In some implementations, the UE includes at least one modem, at least one processor communicatively coupled with the at least one modem, and at least one memory communicatively coupled with the at least one processor. The at least one memory stores instructions that, when executed by the at least one processor in conjunction with the at least one modem, causes the UE to perform operations that include receiving a reference signal on each of a number of beams associated with a base station, and determining a delay spread value for each beam of the number of beams. The reference signal may be one of a CSI-RS, a CRS, a DMRS, a BRS, an MRS, or an SRS. The operations may also include identifying each beam of the number of beams for which the determined delay spread value is less than a threshold value.

In some instances, the UE may receive an indication of the threshold value in an RRC configuration or a DCI message. In other instances, the UE may select the threshold value, and/or may transmit the selected threshold value to the base station in a UCI message or a MAC-CE.

In some implementations, the operations may also include determining an RSRP level for each identified beam, and transmitting an indication of the determined RSRP levels of the identified beams to the base station. In some instances, the indication of the determined RSRP levels of the identified beams may be carried in a UCI message or a MAC-CE. The operations may also include receiving, in response to the transmitted indication, a selection of one beam of the number of beams to be allocated for DL transmissions to the UE. In various implementations, the selection of the one beam may be based at least in part on the determined RSRP levels of the identified beams.

In some implementations, the operations may also include receiving DL data from the base station as a single-carrier transmission on the selected beam. In some instances, the single-carrier transmission may occupy a frequency sub-band in the millimeter-wave frequency spectrum. In some other instances, the selected beam may be associated with a DL channel including, for example, a PDSCH or a PDCCH.

In various implementations, the threshold value may be based at least in part on capability information of an equalizer used by the UE to equalize channel delay spread of data transmissions received from the base station. In some instances, the selection of the beam may be further based on the capability information of the equalizer. The capability information may indicate at least one of a number of available taps of the equalizer or whether the equalizer is a time-domain equalizer or a frequency-domain equalizer.

In some implementations, the operations may also include selecting one of a time-domain equalizer or a frequency-domain equalizer to use for equalizing channel delay spread of data transmissions received from the base station, and transmitting an indication of the selection of the time-domain equalizer or the frequency-domain equalizer to the base station. The indication of the selection of the time-domain equalizer or the frequency-domain equalizer may be carried in one of a UCI message or a MAC-CE. In some instances, selecting the time-domain equalizer or the frequency-domain equalizer may be based at least in part on one or more of a transmission bandwidth, a configured MCS, or a determination that the UE is to receive DL data from multiple transmit-reception points (TRPs).

Another innovative aspect of the subject matter described in this disclosure can be implemented as a method for wireless communication. In some implementations, the method may be performed by a UE, and may include receiving a reference signal on each of a number of beams associated with a base station, and determining a signal-to-interference-plus-noise ratio (SINR) value for each beam of the number of beams. The reference signal may be one of a CSI-RS, a CRS, a DMRS, a BRS, an MRS, or an SRS. The method may also include transmitting an indication of the determined SINR values to the base station. The indication of the determined SINR values may be carried in one of a UCI or a MAC-CE. The method may also include receiving, in response to the transmitted indication, a selection of one beam of the number of beams to be allocated for DL transmissions to the UE. In various implementations, the selection of the one beam may be based at least in part on the determined SINR values. In some aspects, the determined SINR values may be based at least in part on a BWP of the base station.

In some implementations, the method may also include receiving DL data from the base station as a single-carrier transmission on the selected beam. In some instances, the single-carrier transmission may occupy a frequency sub-band in the millimeter-wave frequency spectrum. In some other instances, the selected beam may be associated with a DL channel including, for example, a PDSCH or a PDCCH.

In some implementations, determining a respective SINR value may include determining SINR values of output signals of an equalizer associated with the UE and configured to equalize channel delay spread of data transmissions received from the base station. In some instances, the selection of the beam may be further based on capability information of the equalizer. The capability information may indicate at least one of a number of available taps of the equalizer or whether the equalizer is a time-domain equalizer or a frequency-domain equalizer. In other implementations, determining a respective SINR value may include determining an RSRP level for a corresponding beam of the number of beams, determining a noise variance value for the corresponding beam of the number of beams, and determining the respective SINR value based on the determined RSRP level and the determined noise variance value. In some instances, the RSRP levels and the noise variance values may be determined separately.

In various implementations, the method may also include transmitting an indication of one or more of the determined RSRP values or the determined noise variance values to the base station. In some instances, the indication of the determined RSRP values and/or the determined noise variance values may be transmitted to the base station in a UCI message or a MAC-CE.

Another innovative aspect of the subject matter described in this disclosure can be implemented in a UE. In some implementations, the UE includes at least one modem, at least one processor communicatively coupled with the at least one modem, and at least one memory communicatively coupled with the at least one processor. The at least one memory stores instructions that, when executed by the at least one processor in conjunction with the at least one modem, causes the UE to perform operations that include receiving a reference signal on each of a number of beams associated with a base station, and determining an SINR value for each beam of the number of beams. The reference signal may be one of a CSI-RS, a CRS, a DMRS, a BRS, an MRS, or an SRS. The operations may also include transmitting an indication of the determined SINR values to the base station. The indication of the determined SINR values may be carried in one of a UCI or a MAC-CE. The operations may also include receiving, in response to the transmitted indication, a selection of one beam of the number of beams to be allocated for DL transmissions to the UE. In various implementations, the selection of the one beam may be based at least in part on the determined SINR values. In some aspects, the determined SINR values may be based at least in part on a BWP of the base station.

In some implementations, the operations may also include receiving DL data from the base station as a single-carrier transmission on the selected beam. In some instances, the single-carrier transmission may occupy a frequency sub-band in the millimeter-wave frequency spectrum. In some other instances, the selected beam may be associated with a DL channel including, for example, a PDSCH or a PDCCH.

In some implementations, determining a respective SINR value may include determining SINR values of output signals of an equalizer associated with the UE and configured to equalize channel delay spread of data transmissions received from the base station. In some instances, the selection of the beam may be further based on capability information of the equalizer. The capability information may indicate at least one of a number of available taps of the equalizer or whether the equalizer is a time-domain equalizer or a frequency-domain equalizer. In other implementations, determining a respective SINR value may include determining an RSRP level for a corresponding beam of the number of beams, determining a noise variance value for the corresponding beam of the number of beams, and determining the respective SINR value based on the determined RSRP level and the determined noise variance value. In some instances, the RSRP levels and the noise variance values may be determined separately.

In various implementations, the operations may also include transmitting an indication of one or more of the determined RSRP values or the determined noise variance values to the base station. In some instances, the indication of the determined RSRP values and/or the determined noise variance values may be transmitted to the base station in a UCI message or a MAC-CE.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example of a first 5G NR frame.

FIG. 2B shows example downlink (DL) channels within a 5G NR slot.

FIG. 2C shows an example of a second 5G NR frame.

FIG. 2D shows example uplink (UL) channels within a 5G NR slot.

FIG. 8A shows a flowchart depicting another example operation for wireless communication that supports beam selection, according to some implementations.

FIG. 8B shows a flowchart depicting another example operation for wireless communication that supports beam selection, according to some implementations.

FIG. 8C shows a flowchart depicting another example operation for wireless communication that supports beam selection, according to some implementations.

FIG. 10D shows a flowchart depicting another example operation for wireless communication that supports beam selection, according to other implementations.

FIG. 11 shows a flowchart depicting another example operation for wireless communication that supports beam selection, according to some other implementations.

Like reference numbers and designations in the various drawings indicate like elements.

DETAILED DESCRIPTION

Figure 1:
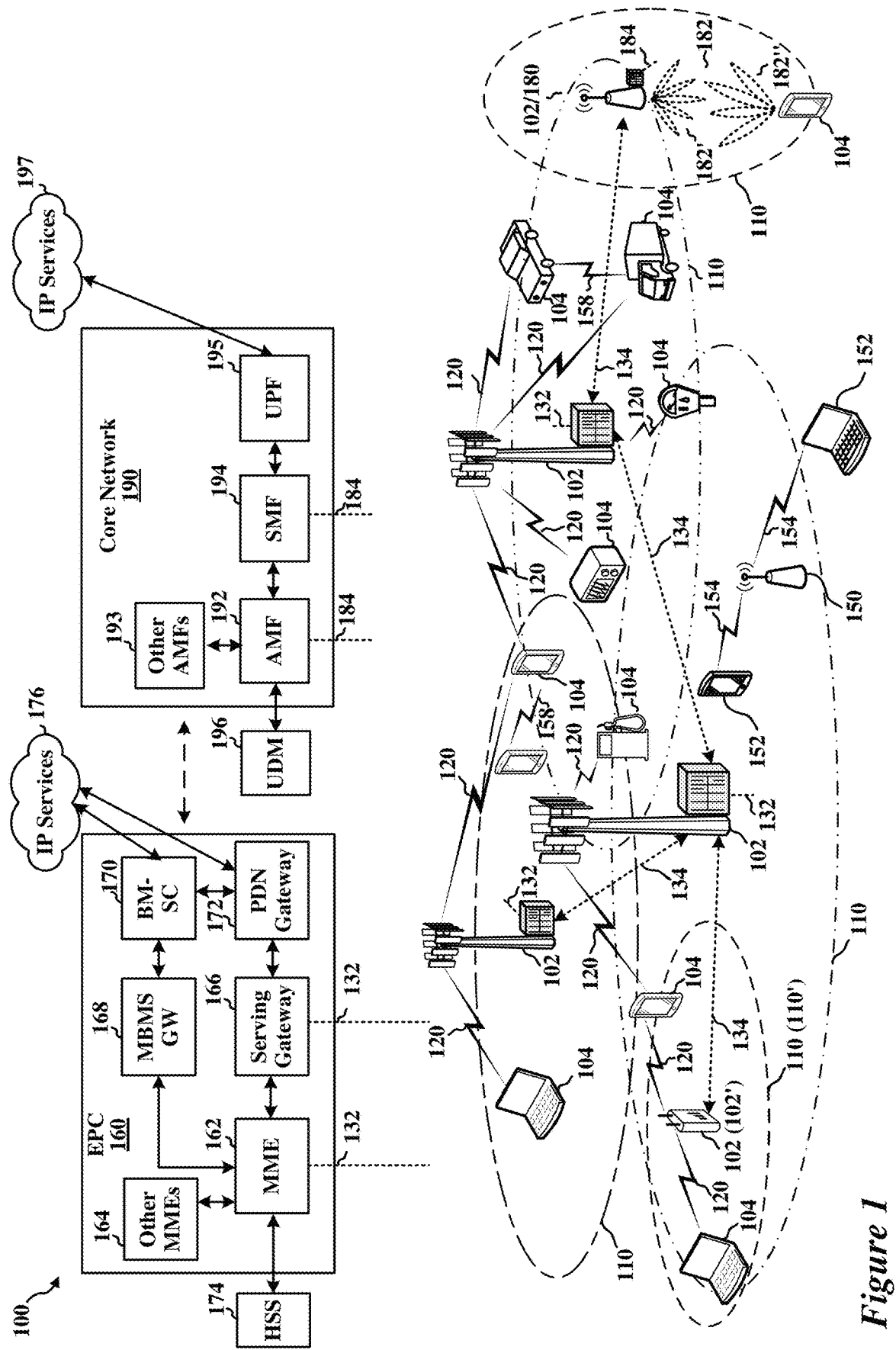
FIG. 1 shows a diagram illustrating an example wireless communications system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Some base stations and UEs may operate in the millimeter wave (mmW) band, which has a relatively short range and suffers from extremely high path loss. Beamforming can be used to compensate for the extremely high path loss and short range of mmW communications. However, because beamforming typically uses relatively narrow beams for directional communications, changes in the operating environment (such movement of UEs), changes in channel conditions, interference from other nearby wireless communication devices, and/or multipath effects may cause a base station utilizing beamforming in mmW communications to switch beams more frequently, for example, than base stations utilizing wideband communications in the 5G frequency spectrum. When a base station switches from a source beam to a target beam, each of the UEs served by the base station must also switch from the source beam to the target. Due to the relatively narrow beams used for beamforming wireless transmissions in the mmW band, determining a suitable target beam during beam switching operations can be challenging. Thus, there is a need for wireless communication devices (such as base stations and UEs) operating in the mmW band to identify the most suitable beam over which to exchange wireless communications.

Channel delay spread may refer to increases in the width or duration of transmitted symbols caused by filter delays in the transmitting device, filter delays in the receiving device, and multipath effects of the wireless medium. Many UEs use time-domain equalizers to compensate for channel delay spread in single-carrier transmissions. These time-domain equalizers typically need a relatively large number of taps to compensate for channel delay spread in mmW communications (as compared to communications in the 5 GHz frequency spectrum). Although the relatively large number of taps in equalizers used for equalizing channel delay spread of single carrier transmissions in the mmW band may significantly increase equalizer complexity and power consumption, decreasing the number of equalizer taps (e.g., to reduce complexity and power consumption) may cause significant performance loss for single carrier transmissions in the mmW band, for example, because the equalizers may not have enough taps to compensate for large numbers of multipath.

Aspects of the present disclosure may improve beam selection for single carrier transmissions in the mmW band by accounting for the capabilities and/or constraints of equalizers used by UEs to compensate for channel delay spread. Moreover, Applicant has determined that a particular channel delay spread may not always translate to a corresponding number of equalizer taps due to different tap distributions of various equalizers used by UEs. As such, the beam selection techniques disclosed herein may also be based on the delay spread of a particular channel or beam associated with the base station. In some implementations, the UE may determine the delay spread for each beam of a number of beams associated with a base station, and may identify each beam for which the determined delay spread is less than a threshold value. The UE may determine an RSRP level for each identified beam, and may transmit an indication of the determined RSRP levels of the identified beams to the base station. The base station may use the RSRP levels of beams for which the delay spread is less than the threshold value to select one of the beams to be allocated for DL transmissions to the UE. The base station may provide an indication of the selected beam to the UE.

By determining RSRP levels only for beams in which the channel delay spread is less than a threshold value, aspects of the subject matter disclosed herein may ensure that a UE using an equalizer having a certain number of taps is capable of compensating for multipath effects contributing to the channel delay spread. For example, if a particular beam has a channel delay spread greater than the threshold value, which may indicate that the UE's equalizer does not have enough taps to compensate for multipath effects affecting the particular beam, then the particular beam may not be selected for communications with the UE. In some aspects, the UE and the base station may determine an acceptable amount of delay spread, and may select the threshold value based on the determined amount of delay spread. In addition, or in the alternative, the UE may inform the base station of its equalizer capabilities and/or equalizer type, for example, so that beam selection operations may be based at least in part on the type of equalizer and/or the capabilities of the equalizer used by the UE to equalize channel delay spread. In this manner, the beam selection operations disclosed herein may account for various equalizer configurations employed by different UEs, which in turn may improve beam selection (as compared with conventional beam selection techniques).

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100, which may include a Next Generation RAN (NG-RAN), includes base stations 102, UEs 104, an Evolved Packet Core (EPC) 160, and another core network 190. The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 via S1 interfaces, and the base stations 102 configured for 5G NR may interface with the core network 190 through backhaul links 184 via N2 and N3 interfaces. The base stations 102 may communicate with one another through one or more backhaul links 134 via X2 interfaces. The base stations 102 may perform a number of functions including (but not limited to) the transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG).

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 404 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

The wireless communications system may further include a Wi-Fi access point (AP) 150 in communication with Wi-Fi stations (STAs) 152 via communication links 154 in a 2.4 GHz unlicensed frequency spectrum, a 5 GHz unlicensed frequency spectrum, or both. When communicating in an unlicensed frequency spectrum, the STAs 152 and the AP 150 may perform a clear channel assessment (CCA) prior to communicating in order to determine whether the channel is available.

A given base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some UEs 104 may be referred to as IoT devices (such as a parking meter, gas pump, toaster, vehicles, heart monitor, etc.). Other UEs 104 may be referred to as cellular IoT (CIoT) devices (such as a smartphone capable of narrowband communications based on one or more designed for IoT devices). A UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A base station 102, whether a small cell 102' or a large cell (such as a macro base station), may include an eNB, gNodeB (gNB), or another type of base station. Some base stations, such as gNB 180, may operate in a traditional sub-6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW or near mmW radio frequency band (such as between 3 GHz-300 GHz) has extremely high path loss and a short range. The mmW base station 180 may utilize beamforming 182 with the UE 104 to compensate for the extremely high path loss and short range. Beamforming, which may also be referred to as spatial filtering, directional transmission, or directional reception, is a signal processing technique that may be used at a transmitting device or a receiving device (such as a base station 102 or a UE 104) to shape or steer an antenna beam along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

For example, the base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The base stations 102 and the UEs 104 may wirelessly communicate with each other via one or more communication links 120 using one or more carriers. The term "carrier" may refer to a set of radio frequency spectrum resources having a defined physical layer structure for supporting the communication links 120. For example, a carrier used for a communication link 120 may include a portion of a radio frequency spectrum band (such as a bandwidth part (BWP)) that is operated according to physical layer channels for a given radio access technology. Each physical layer channel may carry acquisition signaling (such as synchronization signals, system information), control signaling that coordinates operation for the carrier, user data, or other signaling. The wireless communications system 100 may support communications between the base station 102 and the UEs 104 using carrier aggregation or multi-carrier operation. Carrier aggregation may be used with both frequency division duplexing (FDD) and time division duplexing (TDD) component carriers. Allocation of carriers may be asymmetric with respect to the DL and UL channels, for example such that the UL and DL channels may include different numbers of carriers. The component carriers may include a primary component carrier and one or more secondary component carriers. A primary component carrier may be referred to as a primary cell (PCell), and a secondary component carrier may be referred to as a secondary cell (SCell).

In some examples, a carrier may support multiple cells, and different cells may be configured according to different protocol types (such as MTC, NB-IoT, enhanced mobile broadband (eMBB), or others) that may provide access for different types of devices.

The communication links 120 may include uplink (UL) transmissions from a UE 104 to a base station 102 or downlink (DL) transmissions from a base station 102 to a UE 104. The communication links 120 may use multiple-input and multiple-output (MIMO) antenna technology, for example, to provide spatial multiplexing, beamforming, or transmit diversity. The base stations 102 and UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other.

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some UEs 104, such as MTC or IoT devices, may be low cost or low complexity devices and may provide for automated communication between machines (such as by using Machine-to-Machine (M2M) communication). M2M communication or MTC may refer to data communication technologies that allow devices to communicate with one another or a base station 102 without human intervention. In some examples, M2M communication or MTC may include communications from devices that integrate sensors or meters to measure or capture information and relay such information to a central server or application program that makes use of the information or presents the information to humans interacting with the application program. Some UEs 104 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 104 and a base station 102 or EPC 160 supporting radio bearers for user plane data. At the Physical layer, transport channels may be mapped to physical channels.

The EPC 160 may provide user authentication, access authorization, tracking, Internet Protocol (IP) connectivity, and other access, routing, or mobility functions. In some implementations, the EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is a control plane entity that manages access and mobility, and may be in communication with a Home Subscriber Server (HSS) 174. The MME 162 may manage non-access stratum (NAS) functions such as mobility, authentication, and bearer management for UEs 104 served by base stations 104 associated with the EPC 160, and may process the signaling between the UEs 104 and the EPC 160. All user IP packets are transferred through the Serving Gateway 166, which is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, one or more other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User IP packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

Referring again to FIG. 1, in certain aspects, the base station 102/180 may be configured to select a beam for transmitting DL data to a UE 104 based on one or more of RSRP levels of reference signals received by the UE 104, delay spread values of reference signals received by the UE 104, SINR values of reference signals received by the UE 104, and/or a number of settings or capabilities of equalizers used by the UE 104 for equalizing channel delay spread associated with data received from the base station.

FIG. 2A shows an example of a first slot 200 within a 5G NR frame structure. FIG. 2B shows an example of DL channels 230 within a 5G NR slot. FIG. 2C shows an example of a second slot 250 within a 5G NR frame structure. FIG. 2D shows an example of UL channels 280 within a 5G NR slot. In some instances, the 5G NR frame structure may be FDD in which, for a particular set of subcarriers (carrier system bandwidth), slots within the set of subcarriers are dedicated for either DL or UL transmissions. In some other instances, the 5G NR frame structure may be TDD in which, for a particular set of subcarriers (carrier system bandwidth), slots within the set of subcarriers are dedicated for both DL and UL transmissions. In the examples shown in FIGS. 2A and 2C, the 5G NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G NR frame structure that is based on FDD.

Other wireless communication technologies may have a different frame structure or different channels. A frame may be divided into a number of equally sized subframes. For example, a frame having a duration of 10 milliseconds (ms) may be divided into 10 equally sized subframes each having a duration of 1 ms. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and 2μ slots per subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (μs).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
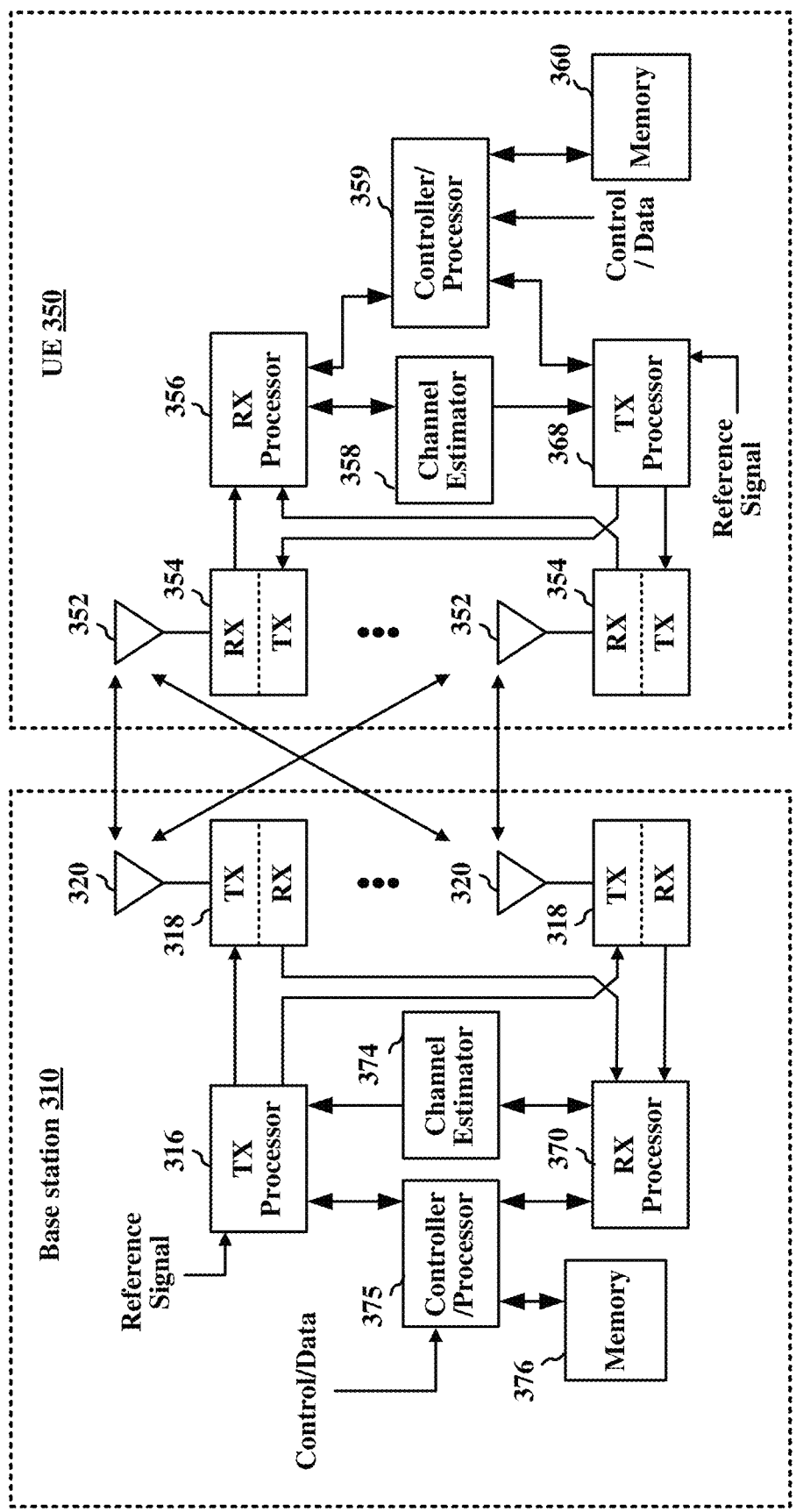
FIG. 3 shows a diagram illustrating an example of a base station and user equipment (UE) in an access network.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in some other implementations, the UE 350 may include fewer transmitters (or transmit chains) than receive (RX) antennas. Although not shown for simplicity, each transmitter may be coupled to a respective power amplifier (PA) which amplifies the signal to be transmitted. The combination of a transmitter and a PA may be referred to herein as a "transmit chain" or "TX chain." To save on cost or die area, the same PA may be reused to transmit signals over multiple RX antennas. In other words, one or more TX chains of a UE may be selectively coupled to multiple RX antennas ports.

As discussed above, mmW band communications have a relatively short range and typically suffer from extremely high path loss. For example, due to their relatively small wavelengths, mmW communications are more sensitive to atmospheric attenuation, multipath propagation, channel delay spread, and interference than communications in the 5 GHz frequency spectrum. Multipath propagation is caused by RF signals taking different paths from a transmitter to a receiver and subsequently interfering with each other. The different path lengths, which may be based on atmospheric reflection and refraction and/or reflections from nearby objects or surfaces, may result in a time delay (or a phase shift) between different copies of the transmitted signal, which in turn may cause inter-symbol interference (ISI). Channel delay spread refers to increases in the width or duration of symbols caused by filter delays in a transmitting device, filter delays in a receiving device, and multipath effects of a wireless channel. A small channel delay spread (e.g., a single path channel) may translate to a low frequency selectivity, whereas a large channel delay spread (e.g., a channel with a large amount of multipath) may translate to a high frequency selectivity.

Many base stations utilize beamforming to compensate for the extremely high path loss and short range of mmW communications. However, because beamforming may use relatively narrow beams for directional communications, changes in the operating environment (such a movement of a UE), changes in channel conditions, interference from other nearby wireless communication devices, or the presence of a structure that blocks a beam may cause a base station and its served UEs to switch to a different beam. Thus, there is a need for wireless devices operating in the millimeter wave band to determine which beam to use for communications.

Beam selection for directional transmissions may be based on criteria such as reference signal received power (RSRP) values, reference signal received quality (RSRQ) values, or signal-to-interference-plus-noise ratio (SINR) values. Although sufficient for beam selection in multicarrier (e.g., OFDM) communications in the 5 GHz frequency band, these criteria may not be sufficient for beam selection in single carrier transmissions (such as TDD or FDD communications), particularly in the millimeter wave band. For example, because equalizers used by a UE to compensate for channel delay spread in single carrier transmissions may be time-domain based, the equalizers may need a relatively large number of taps to compensate for multipath effects in millimeter wave communications (as compared to communications in the 5 GHz frequency spectrum). The relatively large number of equalizer taps used for single carrier transmissions in the millimeter wave band may significantly increase equalizer complexity and power consumption. However, decreasing the number of equalizer taps (e.g., to reduce complexity and power consumption) may cause significant performance loss for single carrier transmissions in the millimeter wave band, for example, because the equalizers may not have enough taps to compensate for large numbers of multipath.

As discussed, aspects of the present disclosure may improve beam selection for single carrier transmissions in the mmW band by accounting for the capabilities and/or constraints of equalizers used by UEs to compensate for channel delay spread, and by also accounting for the delay spread of a particular channel or beam associated with the base station. In some implementations, the UE may determine the delay spread for each beam of a number of beams associated with a base station, and may identify each beam for which the determined delay spread is less than a threshold value. The UE may determine an RSRP level for each identified beam, and may transmit an indication of the determined RSRP levels of the identified beams to the base station. The base station may use the RSRP levels of beams for which the delay spread is less than the threshold value to select one of the beams to be allocated for DL transmissions to the UE, and may provide an indication of the selected beam to the UE.

By determining RSRP levels only for beams in which the channel delay spread is less than a threshold value, aspects of the subject matter disclosed herein may ensure that a UE using an equalizer having a certain number of taps is capable of compensating for multipath effects contributing to the channel delay spread. For example, if a particular beam has a channel delay spread greater than the threshold value, which may indicate that the UE's equalizer does not have enough taps to compensate for multipath effects affecting the particular beam, then the particular beam may not be selected for communications with the UE. In some aspects, the UE and the base station may determine an acceptable amount of delay spread, and may select the threshold value based on the determined amount of delay spread. In addition, or in the alternative, the UE may inform the base station of its equalizer capabilities and/or equalizer type, for example, so that beam selection operations may be based at least in part on the type of equalizer and/or the capabilities of the equalizer used by the UE to equalize channel delay spread. In this manner, the beam selection operations disclosed herein may account for various equalizer configurations employed by different UEs, which in turn may improve beam selection (as compared with conventional beam selection techniques).

Figure 4:
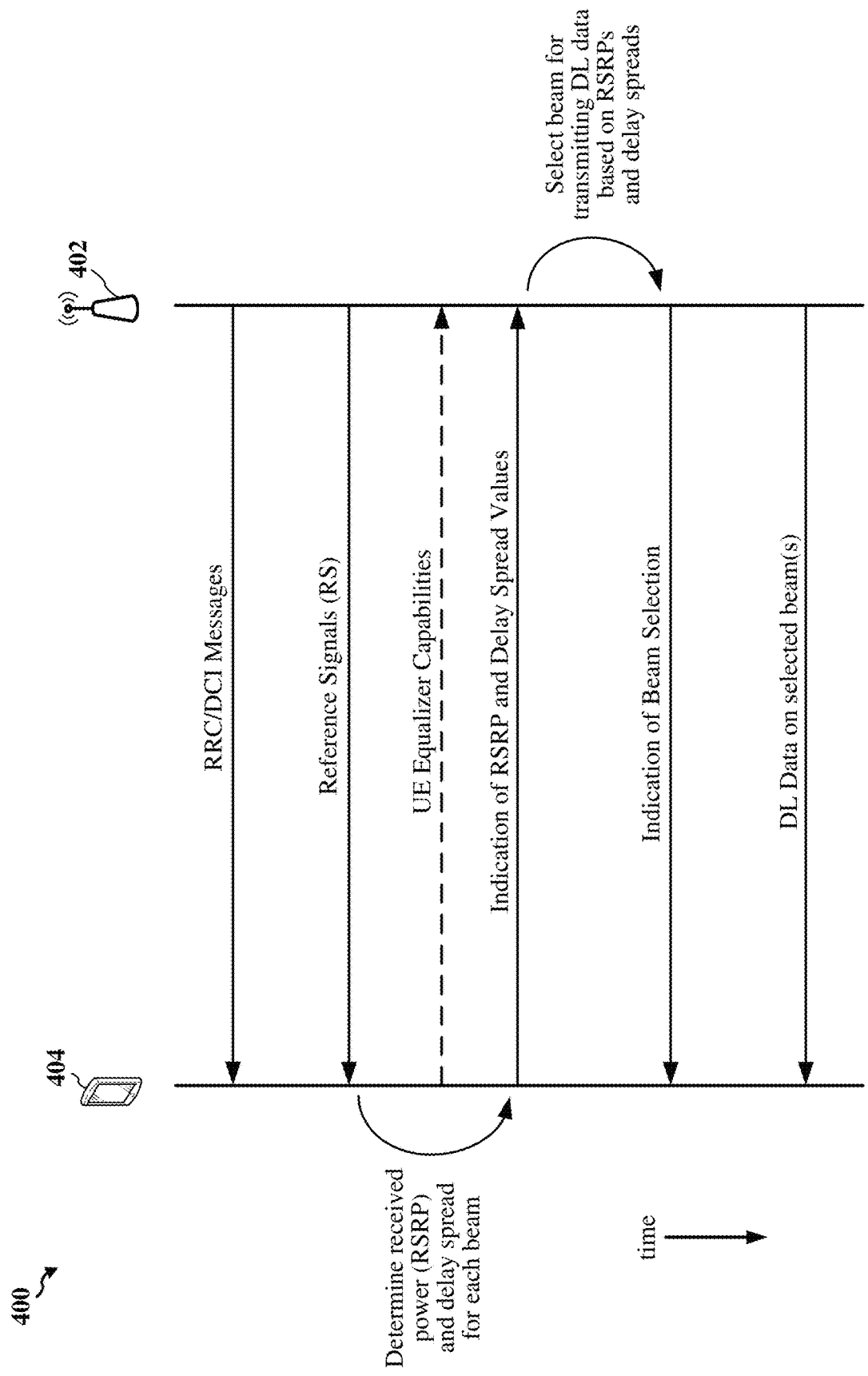
FIG. 4 shows a sequence diagram depicting an example message exchange between a base station and a UE in an access network.

FIG. 4 shows a sequence diagram depicting an example message exchange 400 between a base station 402 and a UE 404 in an access network. In some implementations, the base station 402 may be one example of the base station 102 of FIG. 1, the UE 404 may be one example of the UE 104 of FIG. 1, and the access network may be a 5G NR access network. The base station 402 may be any suitable base station or node including, for example, a gNB or an eNB. Although not shown for simplicity, the base station 402 may include a multitude of antennas that can be configured to wirelessly transmit and/or receive information on a plurality of different beams, for example, to facilitate MIMO communications and beamforming. In some implementations, the base station 404 may transmit data and/or control information to the UE 402 using a single beam.

The UE 404 may receive one or more radio resource control (RRC) messages that can facilitate connection establishment and release functions, broadcast of system information, radio bearer establishment, reconfiguration and release operations, RRC connection mobility procedures, paging notification, and power control. The RRC may also configure user and control planes, define multiple downlink semi-persistent scheduling (SPS) configurations, define multiple uplink configured grant (CG) configurations, and control various other functions of the access network.

The UE 404 may also receive Downlink Control Information (DCI) messages from the base station 402. The DCI messages may contain a number of parameters, configurations, schedules, and/or characteristics of one or more downlink (DL) channels or beams upon which the base station 402 can transmit DL data and control information to the UE 404. The DCI messages may also activate and release one or more SPS configurations and/or one or more CG configurations. In some implementations, one or more DCI messages may include a Transmission Configuration Indication (TCI) containing information pertaining to the beam (or beams) selected for DL transmissions to the UE 404. The UE 404 may use information contained in the TCI for initial data reception operations and for beam handover operations.

The base station 402 may periodically transmit a reference signal (RS) on each of a number of its beams. The reference signals may be physical (PHY) layer signals that provide downlink power reference points for UEs within the coverage area of the base station 402. In some implementations, the reference signals may be transmitted on specific resource elements (REs) in each slot, and the location of the REs may be determined by the particular antenna configuration of the base station 402. In some aspects, the reference signals may be one of a channel state information reference signal (CSI-RS), a cell specific reference signal (CRS), a demodulation reference signal (DMRS), a beamforming reference signal (BRS), a beamforming measurement reference signal (MRS), or a sounding reference signal (SRS). In other aspects, the reference signals may be other suitable signals from which UEs can determine power levels, determine signal-to-noise ratios (SNRs) or signal-to-interference-plus-noise ratios (SINRs), estimate channel conditions, and/or determine the delay spread of a channel or beam.

The UE 404 may receive the reference signals, and may determine a reference signal received power (RSRP) level and a delay spread value for each of the reference signals or beams transmitted from the base station 402. The determined RSRP levels and delay spread values, which may be indicative of channel conditions associated with the reference signals or beams, may be determined by the UE 404 using any suitable technique. In one or more implementations, the UE 404 may also determine a reference signal received quality (RSRQ) level for each reference signal or beam.

The UE 404 may transmit an indication of the determined RSRP levels and the determined delay spread values to the base station 402. In some implementations, indications of the determined RSRP levels and delay spread values may be transmitted to the base station 402 in one of a uplink control information (UCI) message or a medium access control (MAC) control element (MAC-CE). In other implementations, the indications may be transmitted to the base station 402 using any other suitable message, element, or frame.

The base station 402 may receive the determined RSRP levels and delay spread values, and may select or allocate one or more beams for data transmissions to the UE 404 based on the determined RSRP levels and delay spread values. The indication of the beam selection may be transmitted to the UE 404 using any suitable message, frame, or signaling technique. In some implementations, the beam selection indication may be transmitted to the UE 404 in the DCI messages, in the RRC messages, or in any other suitable layer-2 (L2) message or frame.

The UE 404 may receive and decode the beam selection indication, for example, to determine the location of resource elements (REs) corresponding to the selected beam (s). Thereafter, the UE may receive DL data from the base station 402 on the REs corresponding to the selected beam (s). In some implementations, the selected or allocated beams may be configured for single-carrier transmissions in the mmW frequency spectrum.

Although not shown in FIG. 4 for simplicity, the UE 404 may include one or more equalizers configured to equalize or compensate for channel delay spread associated with data transmissions received from the base station 402. In some implementations, the UE 404 may include different types of equalizers (such as time-domain equalizers and frequency-domain equalizers) having one or more settings that can be dynamically configured or adjusted, for example, based on channel conditions, channel delay spread, and other factors. In some implementations, the UE 404 may transmit capability information of one or more of its equalizers to the base station 402 in an uplink control information (UCI) message, a medium access control (MAC) control element (MAC-CE), or any other suitable message or frame. In some aspects, the UE 404 may transmit the capability information and indications of the determined RSRP levels and delay spread values to the base station 402, concurrently. In other aspects, the UE 404 may transmit the capability information during another portion (e.g., at another time) of the message exchange 400.

The capability information may indicate the type of equalizer to be used by the UE 404 (e.g., TDE or FDE), the number of taps of the equalizer to be used by the UE 404, and/or one or more settings of the equalizer to be used by the UE 404. In some implementations, the UE 404 may determine whether to use a time-domain equalizer (TDE) or a frequency-domain equalizer (FDE) to compensate for channel delay spread based at least in part on a transmission bandwidth of a physical downlink shared channel (PDSCH) or a physical downlink control channel (PDCCH) associated with the base station 402. In some aspects, the UE 404 may select the TDE to compensate for channel delay spread based on the transmission bandwidth being greater than a threshold value, and may select the FDE to compensate for channel delay spread based on the transmission bandwidth being less than the threshold value.

UEs served by the base station 402 may have (or be associated with) different threshold values, for example, due to different channel conditions between the base station 402 and each of the served UEs and/or due to different equalizer settings or equalizer capabilities of the served UEs. As such, in some implementations, the base station 402 and the UE 404 may determine an acceptable amount of delay spread, and may set the threshold value for the transmission bandwidth based on the determined amount of delay spread.

Figure 5:
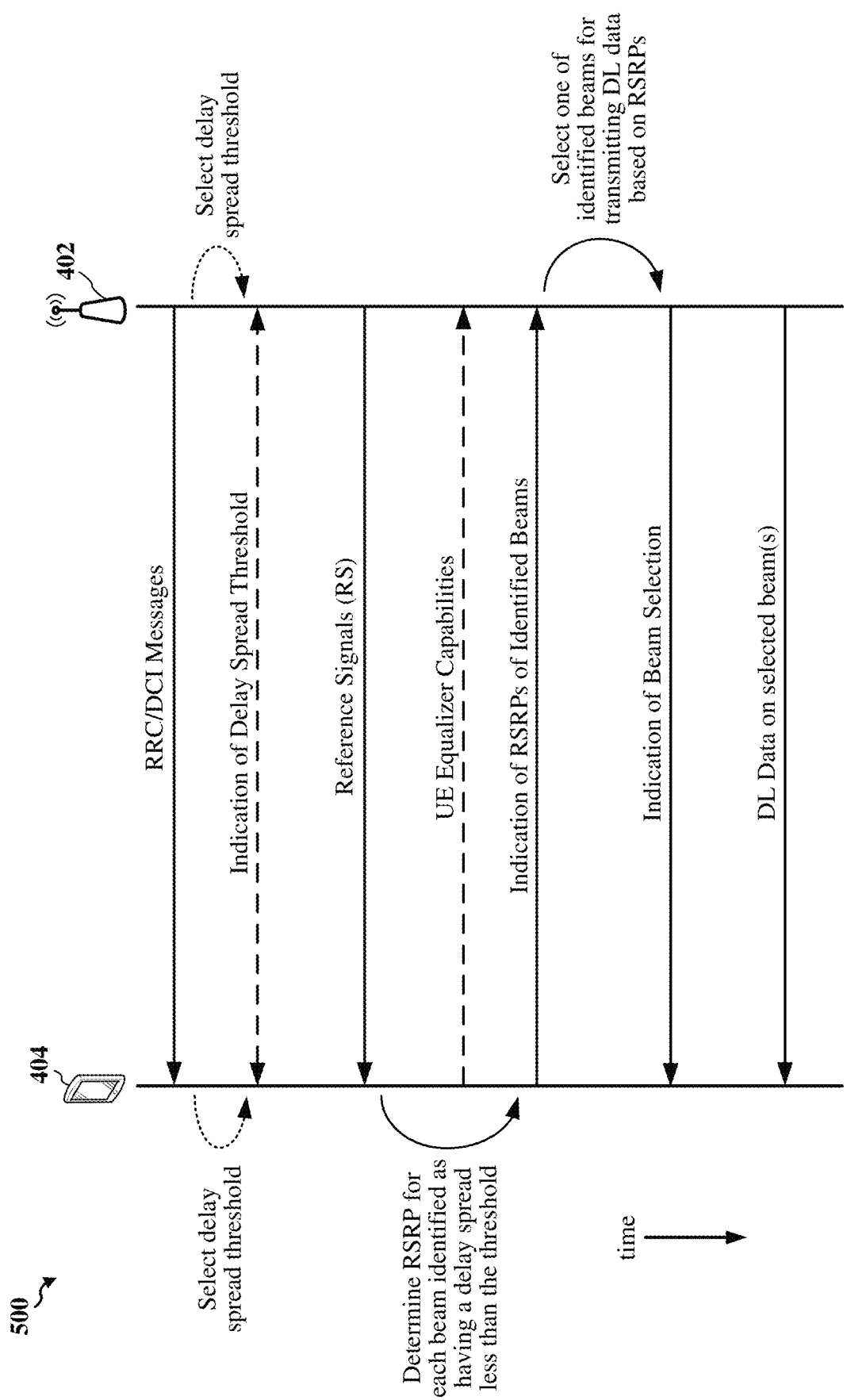
FIG. 5 shows a sequence diagram depicting another example message exchange between the base station and the UE in an access network.

FIG. 5 shows a sequence diagram depicting another example message exchange 500 between the base station 402 and the UE 404 in an access network. In some implementations, the base station 402 may be one example of the base station 102 of FIG. 1, the UE 404 may be one example of the UE 104 of FIG. 1, and the access network may be a 5G NR access network. As discussed above with respect to FIG. 4, the base station 402 may include a multitude of antennas that can be configured to wirelessly transmit and/or receive information on a plurality of different beams, for example, to facilitate MIMO communications and beamforming. In some implementations, the base station 404 may transmit data and/or control information to the UE 402 using a single beam. The UE 404 may receive one or more RRC messages and/or one or more DCI messages containing information described with respect to FIG. 4.

The base station 402 may periodically transmit a reference signal (RS) on each of a number of its beams. In some implementations, the reference signals may be transmitted on specific REs, and the location of the REs may be determined by the particular antenna configuration of the base station 402. In some aspects, the reference signals may be one of a CSI-RS, a CRS, a DMRS, a BRS, a MRS, or a SRS. In other aspects, the reference signals may be other suitable signals from which UEs can determine power levels, determine SNR or SINR values, estimate channel conditions, and/or determine the delay spread of a channel or beam.

The UE 404 may receive the reference signals, and may determine a delay spread value for each of the reference signals or beams transmitted from the base station 402. The delay spread values, which may be indicative of an amount of multipath associated with transmission of the reference signals or beams, may be determined by the UE 404 using any suitable technique.

The UE 404 may identify each beam for which the determined delay spread value is less than a threshold value. In some implementations, the threshold value may be selected based on the type and/or capabilities of the equalizer used by the UE 404 to equalize or compensate for channel delay spread of DL transmissions received from the base station 402. In some aspects, the capability information may include one or more of the maximum amount of multipath for which the UE's equalizer can compensate, the number of taps available to the UE's equalizer, or whether the equalizer is a time-domain equalizer (TDE) or a frequency-domain equalizer (FDE).

In some implementations, the UE 404 may select the threshold value. The UE 404 may indicate (e.g., transmit) the selected threshold value to the base station 402 in a UCI message, in a MAC-CE, or in any other suitable message or frame. In other implementations, the base station 402 may select the threshold value, and may transmit the selected threshold value (or an indication of the threshold value) to the UE 404. In some other implementations, the UE may receive an indication of the selected threshold value in an RRC configuration or a DCI message.

In some implementations, the UE 404 may select either a TDE or a FDE to compensate for channel delay spread based at least in part on one or more of a transmission bandwidth, a configured MCS, or a determination that the UE 404 is to receive downlink data from multiple TRPs. The UE 404 may indicate the selection of the TDE or FDE to the base station 402 in a UCI message, in a MAC-CE, or in any other suitable message or frame.

The UE 404 may determine the RSRP level for each of the identified beams (e.g., for the beams having a channel delay spread less than the threshold value). The RSRP levels, which may be indicative of channel conditions associated with the identified beams, may be determined by the UE 404 using any suitable technique. In other implementations, the UE 404 may also determine the RSRQ level for each of the identified beams.

The UE 404 may transmit indications of the determined RSRP levels of the identified beams to the base station 402. The indications of the determined RSRP levels may be transmitted to the base station 402 in a UCI message, a MAC-CE, or any other suitable message, element, or frame. In some implementations, the UE 404 may also transmit indications of the determined delay spread values of the identified beams to the base station 402, for example, in a UCI message, a MAC-CE, or any other suitable message, element, or frame.

The base station 402 may receive the determined RSRP levels for the identified beams, and may select or allocate one or more beams for data transmissions to the UE 404 based on the determined RSRP levels. The indication of the beam selection may be provided to the UE 404 using any suitable message, frame, or signal. In some implementations, the beam selection indication may be transmitted to the UE 404 in DCI messages or other suitable L2 message or frame. In other implementations, the UE 404 may receive the beam selection indication via RRC configuration.

The UE 404 may receive and decode the beam selection indication to determine the location of the REs corresponding to the selected beam(s), and thereafter receive DL data from the base station 402 on the REs corresponding to the selected beam(s). In some implementations, the selected beam(s) may be configured for single-carrier transmissions in the mmW frequency spectrum.

Similar to aspects of the example of FIG. 4, the UE 404 may transmit equalizer capability information to the base station 402 in a UCI message, a MAC-CE, or any other suitable message or frame. The equalizer capability information may indicate the type of equalizer to be used by the UE 404, the number of taps of the equalizer to be used by the UE 404, and/or one or more settings of the equalizer to be used by the UE 404 to compensate for channel delay spread. In some instances, the capability information may be transmitted to the base station 404 concurrently with the transmission of the delay spread values. In other instances, the capability information may be transmitted to the base station 404 at another time during the message exchange 500.

In some implementations, the UE 404 may determine whether to use a TDE or FDE to compensate for channel delay spread based at least in part on the transmission bandwidth of a PDSCH or a PDCCH. As described with respect to FIG. 4, the UE 404 may select the TDE to compensate for channel delay spread based on the transmission bandwidth being greater than a threshold value, and may select the FDE to compensate for channel delay spread based on the transmission bandwidth being less than the threshold value.

Figure 6:
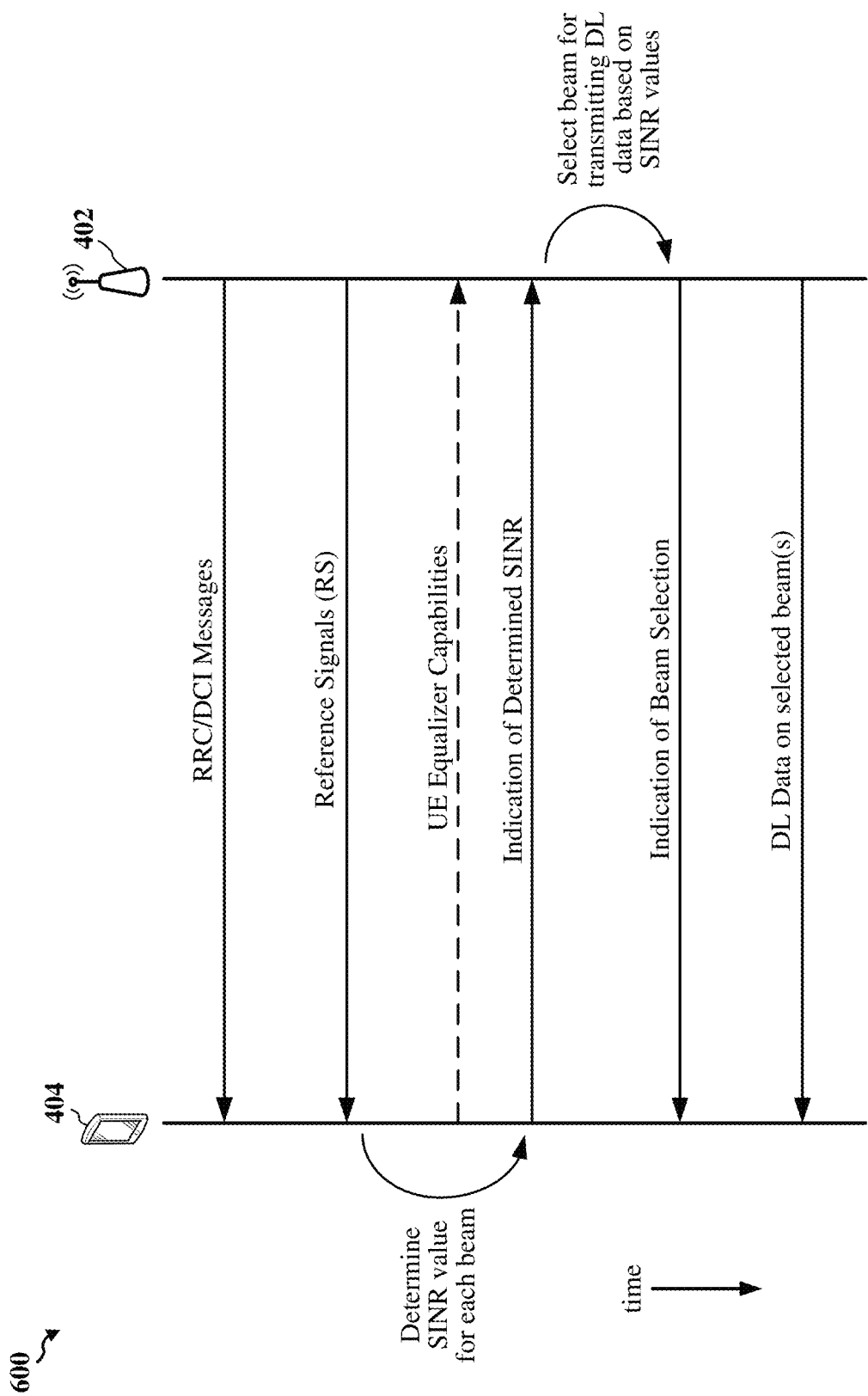
FIG. 6 shows a sequence diagram depicting another example message exchange between the base station and the UE in an access network.

FIG. 6 shows a sequence diagram depicting another example message exchange 600 between the base station 402 and the UE 404 in an access network. In some implementations, the base station 402 may be one example of the base station 102 of FIG. 1, the UE 404 may be one example of the UE 104 of FIG. 1, and the access network may be a 5G NR access network. As discussed above with respect to FIG. 4, the base station 402 may include a multitude of antennas that can be configured to wirelessly transmit and/or receive information on a plurality of different beams, for example, to facilitate MIMO communications and beamforming. In some implementations, the base station 404 may transmit data and/or control information to the UE 402 using a single beam. The UE 404 may receive one or more RRC messages and/or one or more DCI messages containing information described with respect to FIG. 4.

The base station 402 may periodically transmit a reference signal (RS) on each of a number of its beams. In some implementations, the reference signals may be transmitted on specific REs, and the location of the REs may be determined by the particular antenna configuration of the base station 402. In some aspects, the reference signals may be one of a CSI-RS, a CRS, a DMRS, a BRS, a MRS, or a SRS. In other aspects, the reference signals may be other suitable signals from which UEs can determine power levels, determine SNR or SINR values, estimate channel conditions, and/or determine the delay spread of a channel or beam.

The UE 404 may receive the reference signals, and may determine a SINR value for each of the reference signals or beams transmitted from the base station 402. The SINR levels, which may be indicative of channel conditions associated with the reference signals or the beams, may be determined by the UE 404 using any suitable technique. In some implementations, the UE 404 may determine the SINR of a given beam according to procedures specified in one or more of the 3GPP releases. For example, the UE 404 may determine a RSRP level for the given beam, may determine a noise variance for the given beam, and may determine the respective SINR value based on the determined RSRP level and the determined noise variance. In some aspects, the UE 404 may calculate RSRP levels and noise variance separately.

In other implementations, the SINR values may be determined based on output signals (after decoding) of the equalizer used by the UE 404 to compensate for channel delay spread, for example, to account for self-interference of the equalizer. In some other implementations, the SINR values may be determined as a function of the configured bandwidth of the beams or as a function of a given bandwidth part (BWP) of the base station 402. Additionally or alternatively, determination of the SINR values may be based at least in part on the type and/or capabilities of the equalizer selected by the UE 404 to compensate for channel delay spread.

In some implementations, the UE 404 may transmit indications of the determined SINR values to the base station 402 in a UCI message, a MAC-CE, or any other suitable message, element, or frame. The UE 404 may also transmit indications of one or both of the determined RSRP values and noise variance to the base station 402. The base station 402 may receive the determined SINR levels, and may select or allocate one or more beams for data transmissions to the UE 404 based on the determined SINR levels. In addition, or in the alternative, the beams may be ranked based on the determined SINR values, for example, to determine a preferred beam for receiving data from the base station 404.

The UE 404 may transmit an indication of the preferred beam to the base station 404 in any suitable L2 message (e.g., in a UCI message or in a MAC-CE). The base station 402 may receive the indication of the preferred beam, and may select the preferred beam for data transmissions to the UE 404. The indication of the beam selection may be transmitted to the UE 404 using any suitable message, frame, or signaling technique. In some implementations, the beam selection indication may be transmitted to the UE 404 in the DCI messages, in the RRC messages, or in any other suitable L2 message or frame.

In some other implementations, the beam selection may also be based on the settings, capabilities, and/or the type of equalizer used by the UE 404 to compensate for channel delay spread. Similar to aspects of the examples of FIGS. 4 and 5, the UE 404 may transmit capability information of the equalizer used to compensate for channel delay spread to the base station 402 in a UCI message, a MAC-CE, or any other suitable message or frame. The capability information may be transmitted to the base station 404 concurrently with the transmission of the delay spread values, or may be transmitted to the base station 404 at another time during the message exchange 600.

In some implementations, the UE 404 may determine whether to use a TDE or FDE to compensate for channel delay spread based at least in part on the transmission bandwidth of a PDSCH or a PDCCH. As described with respect to FIG. 4, the UE 404 may select the TDE to compensate for channel delay spread based on the transmission bandwidth being greater than a threshold value, and may select the FDE to compensate for channel delay spread based on the transmission bandwidth being less than the threshold value.

The UE 404 may receive and decode the beam selection indication to determine the location of the REs corresponding to the selected beam(s), and thereafter may receive DL data from the base station 402 on the selected beam(s). In some implementations, the selected beam(s) may be configured for single-carrier transmissions in the mmW frequency spectrum.

Figure 7:
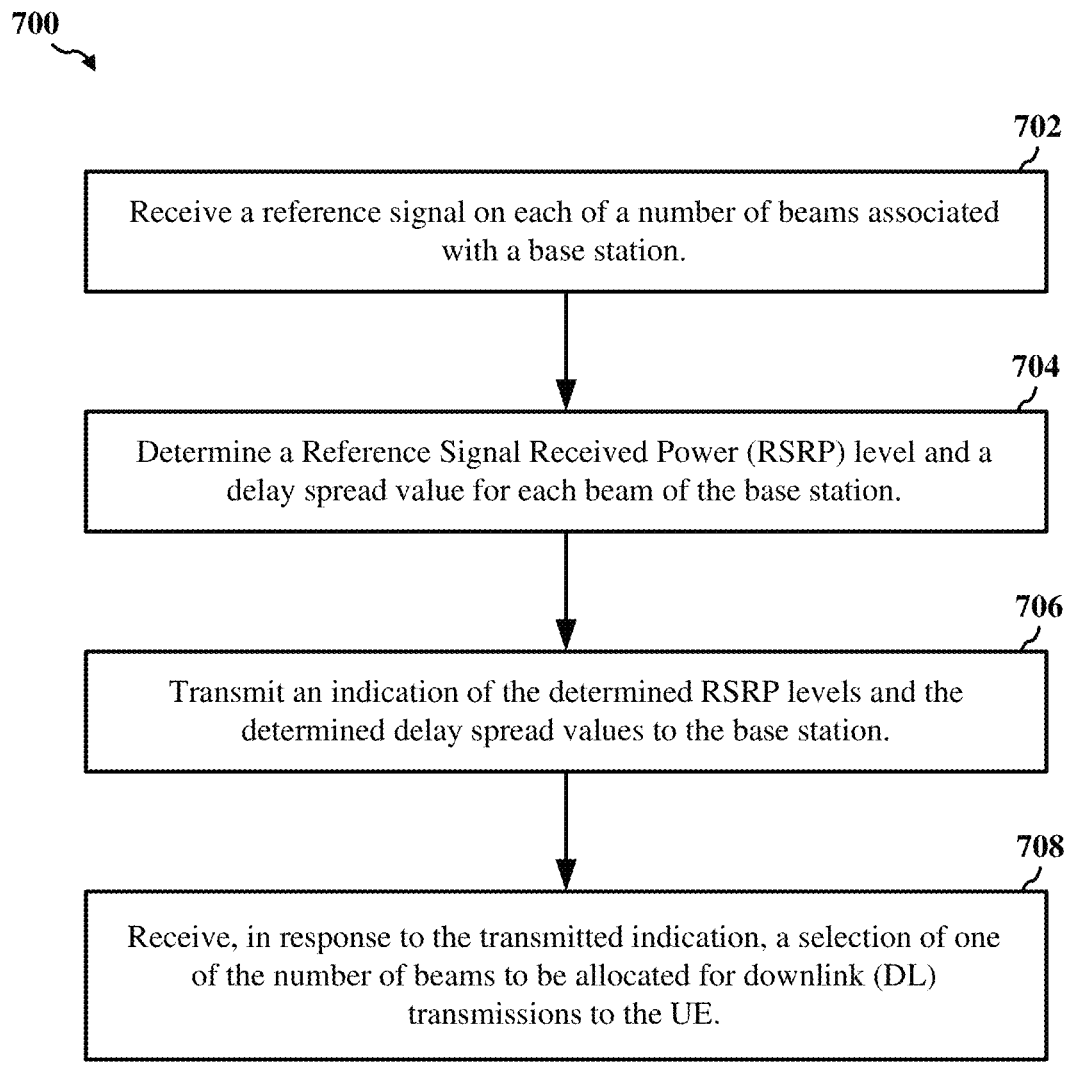
FIG. 7 shows a flowchart depicting an example operation for wireless communication that supports beam selection, according to some implementations.

FIG. 7 shows a flowchart of an example operation 700 for wireless communication that supports beam selection, according to some implementations. The operation 700 may be performed by a wireless communication device such as the UE 104 of FIG. 1, the UE 350 of FIG. 3, or the UE 404 of FIG. 4. Although described with reference to the UE 404 of FIG. 4, the operation 700 may be performed by other suitable wireless communication devices in conjunction with other suitable UEs, base stations, access nodes, TRPs, or network entities.

At block 702, the UE 404 may receive a reference signal on each of a number of beams associated with the base station 402. In some implementations, the reference signals may be carried on specific resource elements (REs) corresponding to the number of beams transmitted from the base station 402. In some instances, each of the reference signals may be one of a channel state information reference signal (CSI-RS), a cell specific reference signal (CRS), a demodulation reference signal (DMRS), a beamforming reference signal (BRS), a beamforming measurement reference signal (MRS), or a sounding reference signal (SRS). In other instances, other suitable reference signals may be used by the UE 404 to measure the channel conditions or channel quality of the DL channel.

At block 704, the UE 404 may determine a reference signal received power (RSRP) level and a delay spread value for each beam of the base station 402. The RSRP levels and the delay spread values, which may be indicative of channel conditions associated with respective beams transmitted by the base station 402, may be determined by the UE 404 using any suitable technique. In some instances, the UE 404 may also determine a reference signal received quality (RSRQ) level for each beam of the base station 404.

At block 706, the UE 404 may transmit an indication of the determined RSRP levels and the determined delay spread values to the base station 402. In some implementations, indications of the determined RSRP levels and delay spread values may be transmitted to the base station 402 in one of a UCI message or a MAC-CE. In other implementations, the indications may be transmitted to the base station 402 using any other suitable message, element, or frame.

At block 708, the UE 404 may receive, in response to the transmitted indication, a selection of one of the number of beams to be allocated for downlink (DL) transmissions to the UE 404. In some implementations, the base station 402 may select or allocate beams for DL transmissions to the UE 404 (and uplink transmissions from the UE 404) based on the RSRP levels and delay spread values determined by the UE 404. In some aspects, the selected beam may be configured for single-carrier transmissions in the mmW frequency spectrum.

FIG. 8A shows a flowchart of an example operation 800 for wireless communication that supports beam selection, according to some implementations. The operation 800 may be performed by a wireless communication device such as the UE 104 of FIG. 1, the UE 350 of FIG. 3, or the UE 404 of FIG. 4. Although described with reference to the UE 404 of FIG. 4, the operation 800 may be performed by other suitable wireless communication devices in conjunction with other suitable UEs, base stations, access nodes, TRPs, or network entities.

In some implementations, the operation 800 may be performed after the UE 404 receives the beam selection for DL transmissions in block 708 of FIG. 7. For example, at block 802, the UE 404 may receive DL data from the base station 402 on the selected beam. As discussed above, the base station 402 may select the beam to be allocated to the UE 404 for DL transmissions based on the RSRP levels and delay spread values determined by the UE 404 and sent to the base station 402.

FIG. 8B shows a flowchart of an example operation 810 for wireless communication that supports beam selection, according to some implementations. The operation 810 may be performed by a wireless communication device such as the UE 104 of FIG. 1, the UE 350 of FIG. 3, or the UE 404 of FIG. 4. Although described with reference to the UE 404 of FIG. 4, the operation 810 may be performed by other suitable wireless communication devices in conjunction with other suitable UEs, base stations, access nodes, TRPs, or network entities.

In some implementations, the operation 810 may be performed at any time during the operation 700 of FIG. 7. For example, at block 812, the UE 404 may inform the base station 402 of capability information of the equalizer to be used by the UE 404 for equalizing channel delay spread of data transmissions received from the base station 402. In some instances, the capability information may indicate the number of available taps of the equalizer and whether the equalizer is a time-domain equalizer (TDE) or a frequency-domain equalizer (FDE). The capability information may be transmitted to the base station 402 using any suitable message or signaling technique. In some instances, the capability information may be sent to the base station 402 in a UCI message. In other instances, the capability information may be sent to the base station 402 in a MAC-CE. In some other instances, the capability information may be provided to the base station 402 using any other suitable message, element, or frame.

In some implementations, the capability information may be transmitted to the base station 402 concurrently with transmitting the indication of the determined RSRP levels and the determined delay spread values to the base station 402. In other implementations, the capability information may be transmitted to the base station 402 during other portions of the operation 700 of FIG. 7. In some other implementations, the capability information may be transmitted to the base station 402 prior to the operation 700 of FIG. 7.

FIG. 8C shows a flowchart of an example operation 820 for wireless communication that supports beam selection, according to some implementations. The operation 820 may be performed by a wireless communication device such as the UE 104 of FIG. 1, the UE 350 of FIG. 3, or the UE 404 of FIG. 4. Although described with reference to the UE 404 of FIG. 4, the operation 820 may be performed by other suitable wireless communication devices in conjunction with other suitable UEs, base stations, access nodes, TRPs, or network entities.

In some implementations, the operation 820 may be performed prior to the operation 700 of FIG. 7. In other implementations, the operation 820 may be performed during any portion of the operation 700 of FIG. 7. For example, at block 822, the UE 404 may select one of a time-domain equalizer (TDE) or a frequency-domain equalizer (FDE) for equalizing channel delay spread of data transmissions from the base station 402 based at least in part on a transmission bandwidth of the DL channel between the base station 402 and the UE 404. The DL channel may be a physical downlink shared channel (PDSCH), a physical downlink control channel (PDCCH), or another suitable DL channel associated with the base station 402.

In some implementations, the UE 404 may select the TDE for equalizing the channel delay spread of data transmissions from the base station 402 when the transmission bandwidth of the DL channel greater than a threshold value. In other implementations, the UE 404 may select the FDE for equalizing the channel delay spread of data transmissions from the base station 402 when the transmission bandwidth of the DL channel is less than the threshold value. In some instances, UEs served by the base station 402 may have different threshold values than one another due to different channel conditions between the base station 402 and each of the served UEs. In addition, or in the alternative, UEs served by the base station 402 may have different threshold values than one another due to different equalizer settings or equalizer capabilities of each of the served UEs. As such, in some implementations, the base station 402 and the UE 404 may determine an acceptable amount of channel delay spread for DL transmissions to the UE 404, and may set the threshold value for the DL transmission bandwidth based on the determined amount of acceptable channel delay spread.

At block 824, the UE 404 may inform the base station 402 of the selection of the TDE or the FDE to be used for equalizing the channel delay spread of DL transmissions to the UE 404. In some instances, the selection of the TDE or FDE may be transmitted to the base station 402 in one of a UCI message or a MAC-CE. In other instances, the selection of the TDE or FDE may be transmitted to the base station 402 using any other suitable message, element, or frame.

In some aspects, the selection of the TDE or the FDE may be transmitted to the base station 402 concurrently with transmitting the indication of the determined RSRP levels and channel delay spread values to the base station 402. In other aspects, the selection of the TDE or the FDE may be transmitted to the base station 402 during another portion of the operation 700 of FIG. 7. In some other aspects, the selection of the TDE or the FDE may be transmitted to the base station 402 prior to the operation 700 of FIG. 7.

Figure 9:
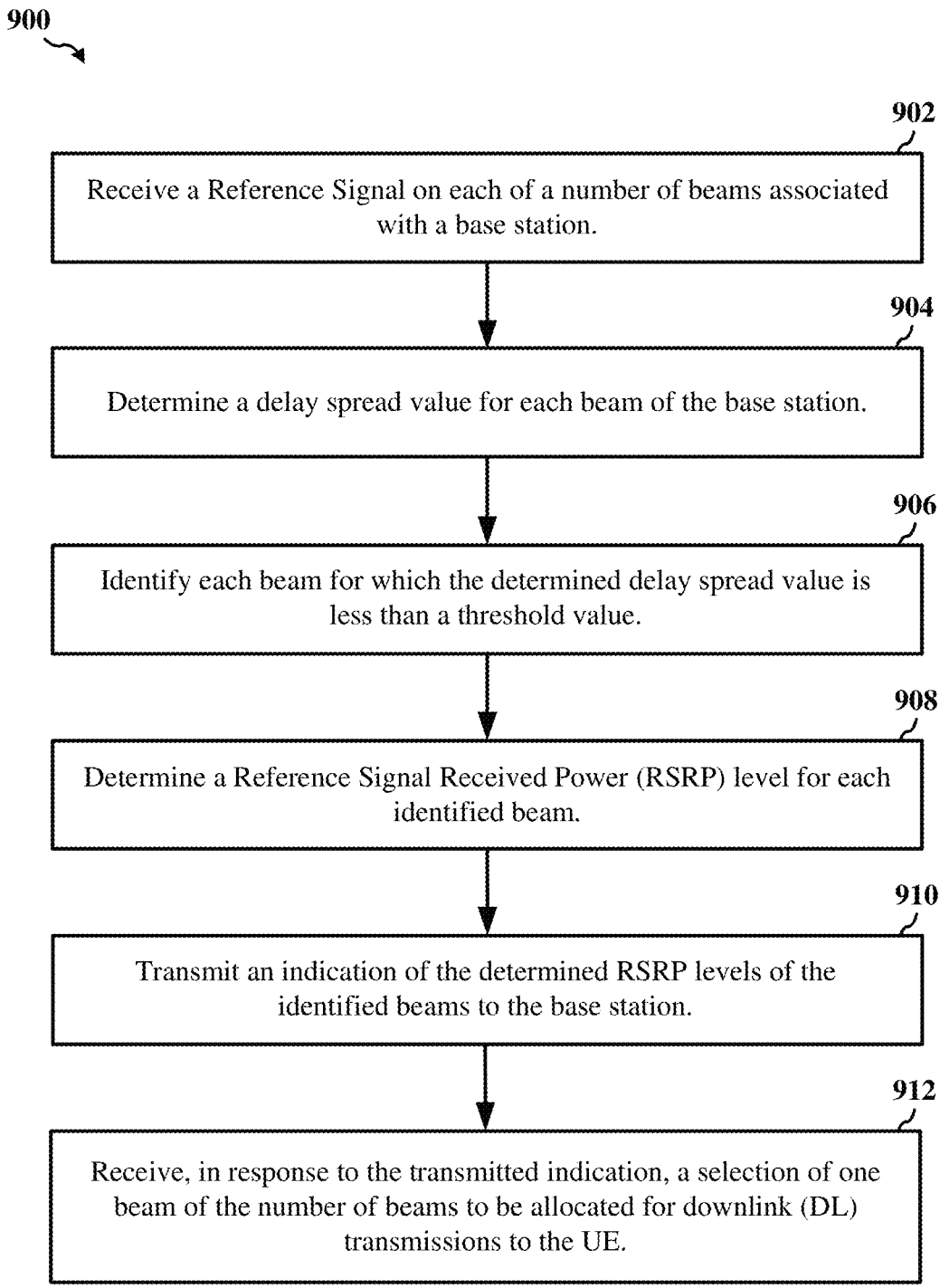
FIG. 9 shows a flowchart depicting another example operation for wireless communication that supports beam selection, according to other implementations.

FIG. 9 shows a flowchart of an example operation 900 for wireless communication that supports beam selection, according to other implementations. The operation 900 may be performed by a wireless communication device such as the UE 104 of FIG. 1, the UE 350 of FIG. 3, or the UE 404 of FIG. 5. Although described with reference to the UE 404 of FIG. 5, the operation 900 may be performed by other suitable wireless communication devices in conjunction with other suitable UEs, base stations, access nodes, TRPs, or network entities.

At block 902, the UE 404 may receive a reference signal on each of a number of beams associated with a base station. In some implementations, the reference signals may be carried on specific REs corresponding to the number of beams transmitted from the base station 402. In some instances, each of the reference signals may be one of a CSI-RS, a CRS, a DMRS, a BRS, a MRS, or an SRS. In other instances, other suitable reference signals may be used by the UE 404 to measure the channel conditions or channel quality of the DL channel.

At block 904, the UE 404 may determine a delay spread value for each beam of the base station 402. The delay spread values, which may be indicative of an amount of multipath associated with each of the beams of the base station 402, filter delays in the base station 402, and/or filter delays in the UE 404, may be determined by the UE 404 using any suitable technique. In some instances, the UE 404 may also determine a reference signal received quality (RSRQ) level for each beam of the base station 402.

At block 906, the UE 404 may identify each beam for which the determined delay spread value is less than a threshold value. In some implementations, selection of the threshold value may be based at least in part on capability information of the equalizer used by the UE 404 to equalize channel delay spread of DL transmissions from the base station 402. In some instances, the capability information may indicate the available number of taps of the equalizer and/or whether the equalizer is a time-domain equalizer (TDE) or a frequency-domain equalizer (FDE). In some other instances, the capability information may also indicate the maximum amount of multipath for which the UE's equalizer can compensate.

At block 908, the UE 404 may determine a reference signal received power (RSRP) level for each identified beam. The determined RSRP levels, which may be indicative of channel conditions associated with each of the identified beams, may be determined by the UE 404 using any suitable technique. That is, the determined RSRP levels may be indicative of channel conditions associated with each beam for which the determined delay spread value is less than a threshold value. In some instances, the UE 404 may also determine an RSRQ level for each of the identified beams.

At block 910, the UE 404 may transmit an indication of the determined RSRP levels of the identified beams to the base station 402. In some implementations, the RSRP levels of the identified beams (or indications thereof) may be provided to the base station 402 in one of a UCI message or a MAC-CE. In other implementations, the RSRP levels of the identified beams (or indications thereof) may be provided to the base station 402 using any other suitable message, frame, or signal.

At block 912, the UE 404 may receive, in response to the transmitted indication, a selection of one beam of the number of beams to be allocated for downlink (DL) transmissions to the UE 404. In some implementations, the selected beam may be configured for single-carrier transmissions in the mmW frequency spectrum. In some instances, the selection of the one beam for DL transmissions to the UE 404 may be based at least in part on the determined RSRP levels of the identified beams. In other instances, the selection of the beam for DL transmissions to the UE 404 may also be based on capability information of the equalizer used by the UE 404 to equalize channel delay spread of DL transmissions to the UE 404. The capability information may indicate the available number of taps of the equalizer, whether the equalizer is a time-domain equalizer (TDE) or a frequency-domain equalizer (FDE), and/or the maximum amount of multipath for which the UE's equalizer can compensate.

Figure 10A:
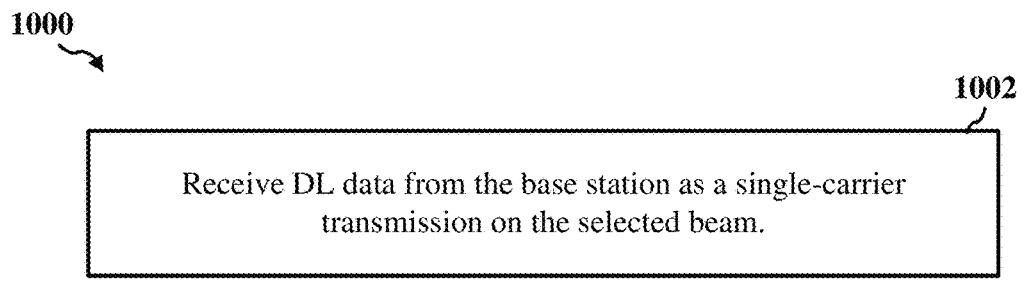
FIG. 10A shows a flowchart depicting another example operation for wireless communication that supports beam selection, according to other implementations.

FIG. 10A shows a flowchart of an example operation 1000 for wireless communication that supports beam selection, according to other implementations. The operation 1000 may be performed by a wireless communication device such as the UE 104 of FIG. 1, the UE 350 of FIG. 3, or the UE 404 of FIG. 5. Although described with reference to the UE 404 of FIG. 5, the operation 1000 may be performed by other suitable wireless communication devices in conjunction with other suitable UEs, base stations, access nodes, TRPs, or network entities.

In some implementations, the operation 1000 may be performed after the UE 404 receives the beam selection at block 912 in the operation 900 of FIG. 9. At block 1002, the UE 404 may receive DL data from the base station 402 as a single-carrier transmission on the selected beam. In some instances, the single-carrier transmission occupies a frequency sub-band in the mmW frequency spectrum.

Figure 10B:
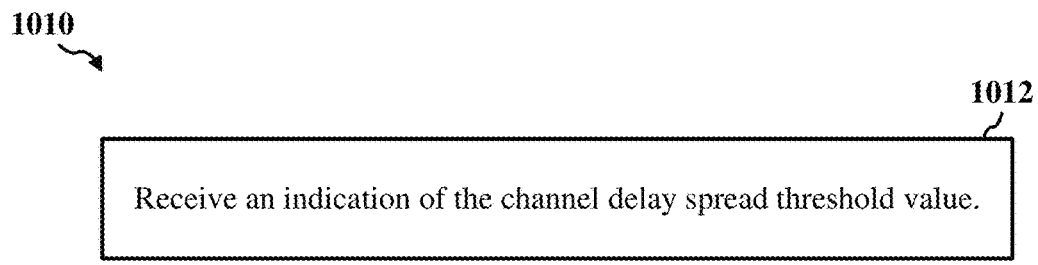
FIG. 10B shows a flowchart depicting another example operation for wireless communication that supports beam selection, according to other implementations.

FIG. 10B shows a flowchart of an example operation 1010 for wireless communication that supports beam selection, according to other implementations. The operation 1010 may be performed by a wireless communication device such as the UE 104 of FIG. 1, the UE 350 of FIG. 3, or the UE 404 of FIG. 5. Although described with reference to the UE 404 of FIG. 5, the operation 1010 may be performed by other suitable wireless communication devices in conjunction with other suitable UEs, base stations, access nodes, TRPs, or network entities.

In some implementations, the operation 1010 may be performed at any time before the UE 404 identifies the beams at block 906 of the operation 900 of FIG. 9. For example, at block 1012, the UE 404 may receive an indication of the channel delay spread threshold value. In some instances, the indication of the channel delay spread threshold value (or the channel delay spread threshold value) may be received via RRC configuration. In other instances, the indication of the channel delay spread threshold value (or the channel delay spread threshold value) may be received in a DCI message. In some other instances, the indication of the channel delay spread threshold value (or the channel delay spread threshold value) may be received in another suitable message, frame, or signal.

Figure 10C:
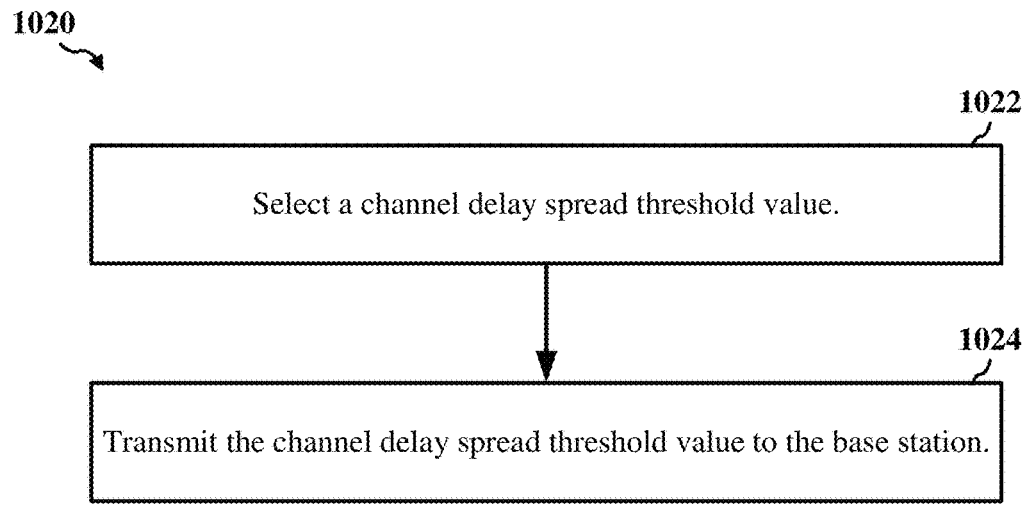
FIG. 10C shows a flowchart depicting another example operation for wireless communication that supports beam selection, according to other implementations.

FIG. 10C shows a flowchart of an example operation 1020 for wireless communication that supports beam selection, according to other implementations. The operation 1020 may be performed by a wireless communication device such as the UE 104 of FIG. 1, the UE 350 of FIG. 3, or the UE 404 of FIG. 5. Although described with reference to the UE 404 of FIG. 5, the operation 1020 may be performed by other suitable wireless communication devices in conjunction with other suitable UEs, base stations, access nodes, TRPs, or network entities.

In some implementations, the operation 1020 may be performed at any time before the UE 404 identifies the beams at block 906 of the operation 900 of FIG. 9. For example, at block 1022, the UE 404 may select a channel delay spread threshold value. At block 1024, the UE 404 may transmit the selected channel delay spread threshold value (or an indication of the threshold value) to the base station 402. In some instances, the selected channel delay spread threshold value (or an indication thereof) may be transmitted to the base station 402 in a UCI message. In other instances, the selected channel delay spread threshold value (or an indication thereof) may be transmitted to the base station 402 in a MAC-CE. In some other instances, the selected channel delay spread threshold value (or an indication thereof) may be transmitted to the base station 402 in another suitable message, frame, or signal.

FIG. 10D shows a flowchart of an example operation 1030 for wireless communication that supports beam selection, according to other implementations. The operation 1030 may be performed by a wireless communication device such as the UE 104 of FIG. 1, the UE 350 of FIG. 3, or the UE 404 of FIG. 5. Although described with reference to the UE 404 of FIG. 5, the operation 1030 may be performed by other suitable wireless communication devices in conjunction with other suitable UEs, base stations, access nodes, TRPs, or network entities.

In some implementations, the operation 1030 may be performed prior to the operation 900 of FIG. 9. In other implementations, the operation 1030 may be performed during any portion of the operation 900 of FIG. 9 prior to identifying the beams for which the delay spread is less than the threshold value. For example, at block 1032, the UE 404 may select one of a time-domain equalizer (TDE) or a frequency-domain equalizer (FDE) for equalizing channel delay spread of data transmissions from the base station 402. In some instances, selection of the TDE or the FDE may be based at least in part on one or more of a transmission bandwidth of a DL channel, a configured MCS for the DL channel, or a determination that the UE is to receive DL data from multiple TRPs. The DL channel may be a physical downlink shared channel (PDSCH), a physical downlink control channel (PDCCH), or another suitable DL channel associated with the base station 402.

In some implementations, the UE 404 may select the TDE for equalizing the channel delay spread of DL transmissions from the base station 402 when the transmission bandwidth of the DL channel greater than a threshold value. In other implementations, the UE 404 may select the FDE for equalizing the channel delay spread of DL transmissions from the base station 402 when the transmission bandwidth of the DL channel is less than the threshold value. In some instances, UEs served by the base station 402 may have different threshold values than one another due to different channel conditions between the base station 402 and each of the served UEs. In addition, or in the alternative, UEs served by the base station 402 may have different threshold values than one another due to different equalizer settings or equalizer capabilities of each of the served UEs. As such, in some implementations, the base station 402 and the UE 404 may determine an acceptable amount of channel delay spread for DL transmissions to the UE 404, and may set the threshold value for the DL transmission bandwidth based on the determined amount of acceptable channel delay spread.

At block 1034, the UE 404 may transmit an indication of selection of the TDE or FDE to the base station 402. In some instances, the indication may be sent to the base station 402 in a UCI message. In other instances, the indication may be sent to the base station 402 in a MAC-CE. In some other instances, the indication may be sent to the base station 402 using any other suitable message, frame, or signal.

FIG. 11 shows a flowchart of an example operation 1100 for wireless communication that supports beam selection, according to some other implementations. The operation 1100 may be performed by a wireless communication device such as the UE 104 of FIG. 1, the UE 350 of FIG. 3, or the UE 404 of FIG. 6. Although described with reference to the UE 404 of FIG. 6, the operation 1100 may be performed by other suitable wireless communication devices in conjunction with other suitable UEs, base stations, access nodes, TRPs, or network entities.

At block 1102, the UE 404 may receive a reference signal on each of a number of beams associated with the base station 402. In some implementations, the reference signals may be carried on REs corresponding to the number of beams transmitted from the base station 402. In some instances, each of the reference signals may be one of a CSI-RS, a CRS, a DMRS, a BRS, a MRS, or an SRS. In other instances, other suitable reference signals may be used by the UE 404 to measure the channel conditions or channel quality of the DL channel.

At block 1104, the UE 404 may determine a signal-to-interference-plus-noise ratio (SINR) value for each beam of the number of beams of the base station 402. In some implementations, the UE 404 may determine the SINR of a given beam according to procedures specified in one or more releases of the 3GPP. For example, in some instances, the UE 404 may calculate RSRP levels and noise variance levels separately when determining the SINR value of a particular beam. In other implementations, the UE 404 may determine the SINR of a respective beam based on the SINR values of output signals of the equalizer used by the UE 404 to equalize channel delay spread of DL transmissions received from the base station 402 on the respective beam. In some other instances, the SINR value of a respective beam may also be based on capability information the equalizer. In some instances, the capability information may indicate the available number of taps of the equalizer and/or whether the equalizer is a time-domain equalizer (TDE) or a frequency-domain equalizer (FDE). In some other instances, the capability information may also indicate the maximum amount of multipath for which the UE's equalizer can compensate.

At block 1106, the UE 404 may transmit an indication of the determined SINR values to the base station 402. In some instances, the UE 404 may transmit the indication to the base station 402 in a UCI message. In other instances, the UE 404 may transmit the indication to the base station 402 in a MAC-CE. In some other instances, the UE 404 may transmit the indication to the base station 402 in another suitable message, frame, or signal.

At block 1108, the UE 404 may receive, in response to the transmitted indication, a selection of one beam of the number of beams to be allocated for DL transmissions to the UE 404. In some implementations, the selected beam may be configured for single-carrier transmissions in the mmW frequency spectrum. In some instances, the selection of the one beam for DL transmissions to the UE 404 may be based at least in part on the determined SINR levels of the base station's beams. In other instances, the selection of the beam for DL transmissions to the UE 404 may also be based on capability information of the equalizer used by the UE 404 to equalize channel delay spread of DL transmissions to the UE 404. The capability information may indicate the available number of taps of the equalizer, whether the equalizer is a time-domain equalizer (TDE) or a frequency-domain equalizer (FDE), and/or the maximum amount of multipath for which the UE's equalizer can compensate.

Figure 12:
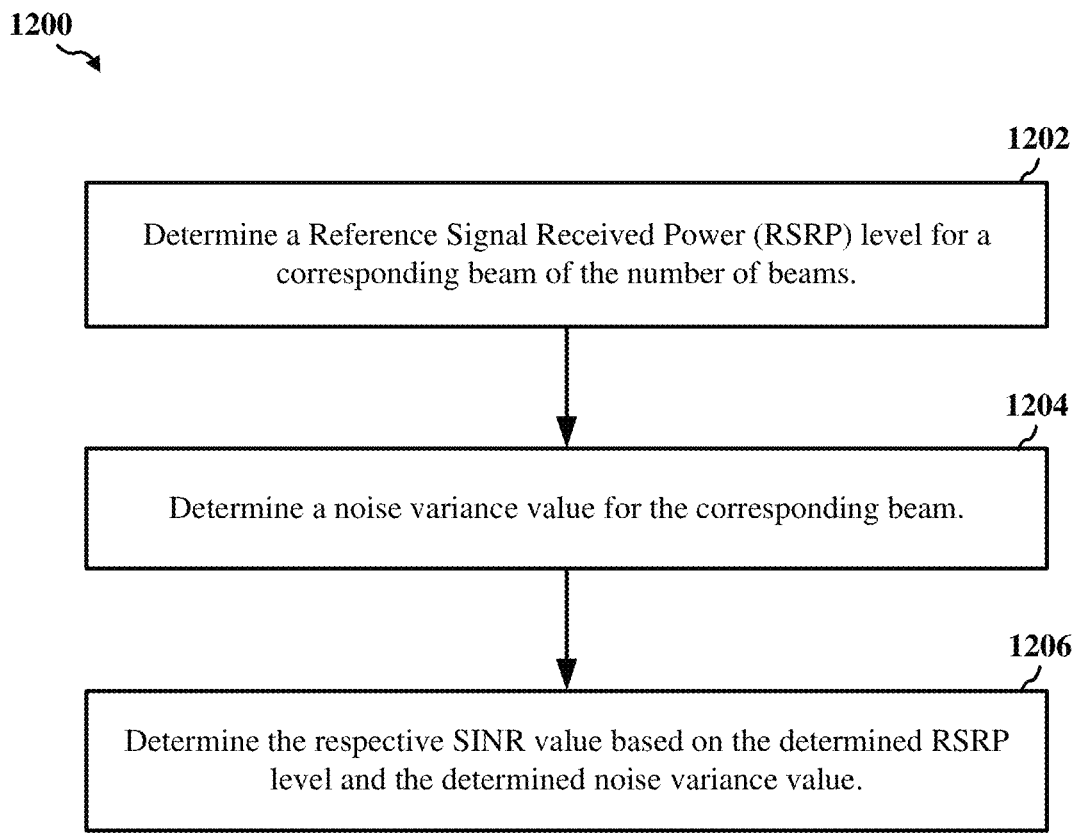
FIG. 12 shows a flowchart depicting another example operation for wireless communication that supports beam selection, according to some other implementations.

FIG. 12 shows a flowchart of an example operation 1200 for wireless communication that supports beam selection, according to some other implementations. The operation 1200 may be performed by a wireless communication device such as the UE 104 of FIG. 1, the UE 350 of FIG. 3, or the UE 404 of FIG. 6. Although described with reference to the UE 404 of FIG. 6, the operation 1200 may be performed by other suitable wireless communication devices in conjunction with other suitable UEs, base stations, access nodes, TRPs, or network entities.

In some implementations, the operation 1200 may be one example of determining the respective SINR value at block 1104 of FIG. 11. For example, at block 1202, the UE 404 may determine a reference signal received power (RSRP) level for a corresponding beam of the base station 402. At block 1204, the UE 404 may determine a noise variance value for the corresponding beam of the base station 402. At block 1206, the UE 404 may determine the respective SINR value based on the determined RSRP level and the determined noise variance value. In some instances, the UE 404 may determine the RSRP levels and the noise variance values for each beam separately (e.g., independently of one another).

Figure 13:
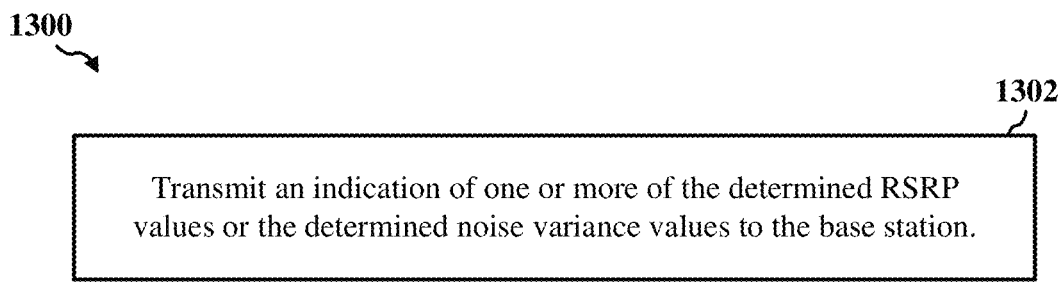
FIG. 13 shows a flowchart depicting another example operation for wireless communication that supports beam selection, according to some other implementations.

FIG. 13 shows a flowchart of an example operation 1300 for wireless communication that supports beam selection, according to some other implementations. The operation 1300 may be performed by a wireless communication device such as the UE 104 of FIG. 1, the UE 350 of FIG. 3, or the UE 404 of FIG. 6. Although described with reference to the UE 404 of FIG. 6, the operation 1300 may be performed by other suitable wireless communication devices in conjunction with other suitable UEs, base stations, access nodes, TRPs, or network entities.

In some implementations, the operation 1300 may be performed after the UE 404 determines the respective SINR value at block 1206 of FIG. 12. For example, at block 1302, the UE 404 may transmit an indication of one or more the determined RSRP values or the determined noise variance values to the base station 402. In some aspects, the indication may be transmitted to the base station 402 in a UCI message or a MAC-CE. In other aspects, the indications may be transmitted to the base station 402 in another suitable message or frame. In some implementations, the base station 402 may use the determined RSRP values and the determined noise variance values to select one or more of its beams for data transmissions with the UE 404.

Figure 14:
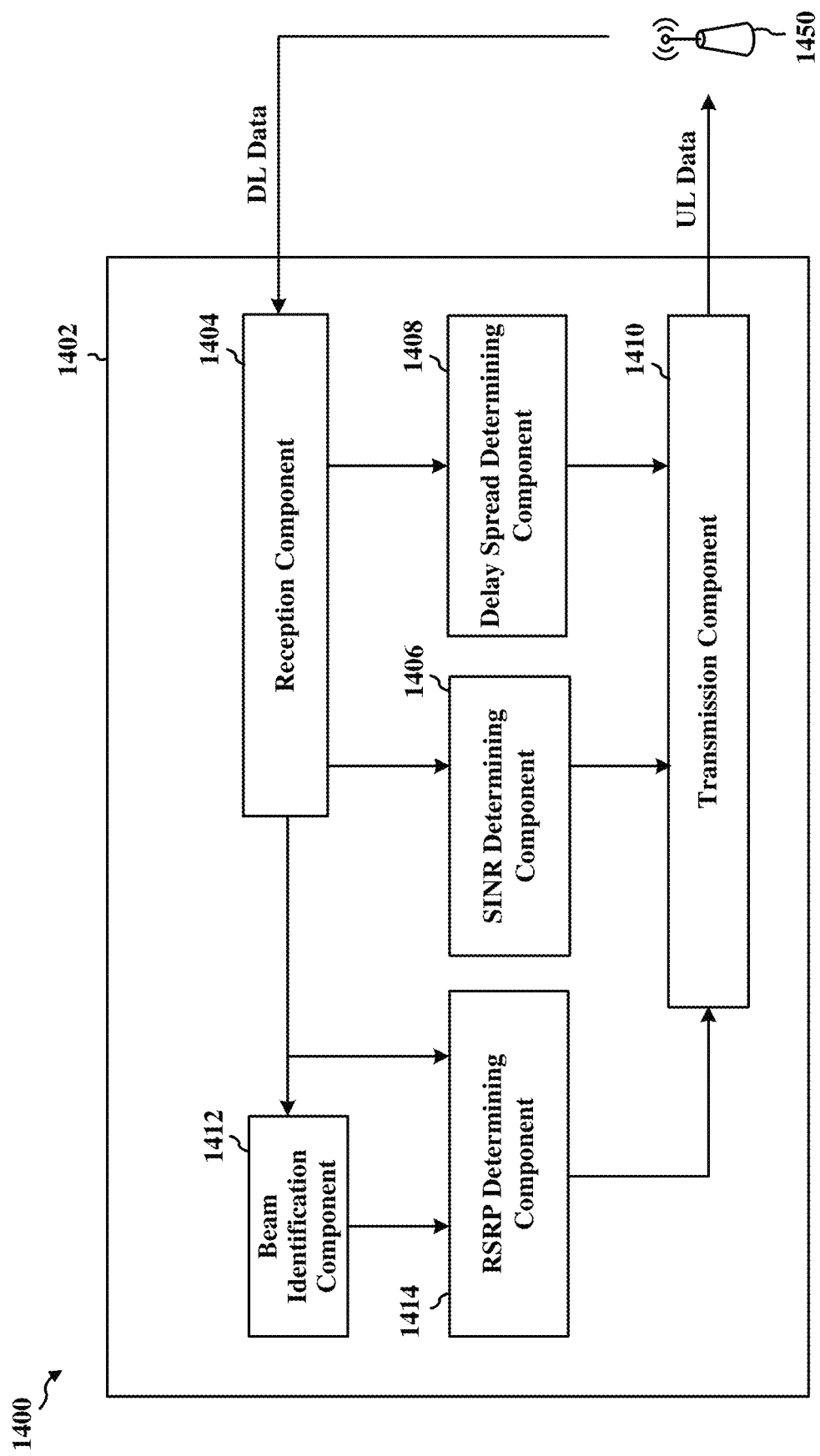
FIG. 14 shows a conceptual data flow diagram illustrating the data flow between different means/components in an example apparatus.

FIG. 14 is a conceptual data flow diagram 1400 illustrating the data flow between different means/components in an example apparatus 1402. The apparatus 1402 may be a UE. The apparatus 1402 includes a reception component 1404 that decodes data and other information received from one or more other devices, an SINR determining component 1406 that determines SINR values for data transmissions received on each of a number of beams associated with a base station, a delay spread determining component 1408 that determines delay spread values for data transmissions on each of the beams associated with the base station, a transmission component 1410 that prepares data and other information for transmission to one or more other devices, a beam identification component 1412 that identifies beams for which delay spread values levels are less than a threshold value, and a RSRP determining component 1414 that determines RSRP levels of data transmissions received on each of the beams associated with the base station.

The apparatus 1402 may include additional components that perform each of the blocks of the algorithm in the aforementioned flowchart(s) of FIGS. 7, 8A, 8B, 8C, 9, 10A, 10B, 10C, 10D, 11, 12, and/or 13. As such, each block in the aforementioned flowchart(s) of FIGS. 7, 8A, 8B, 8C, 9, 10A, 10B, 10C, 10D, 11, 12, and/or 13 may be performed by a component, and the apparatus 1402 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
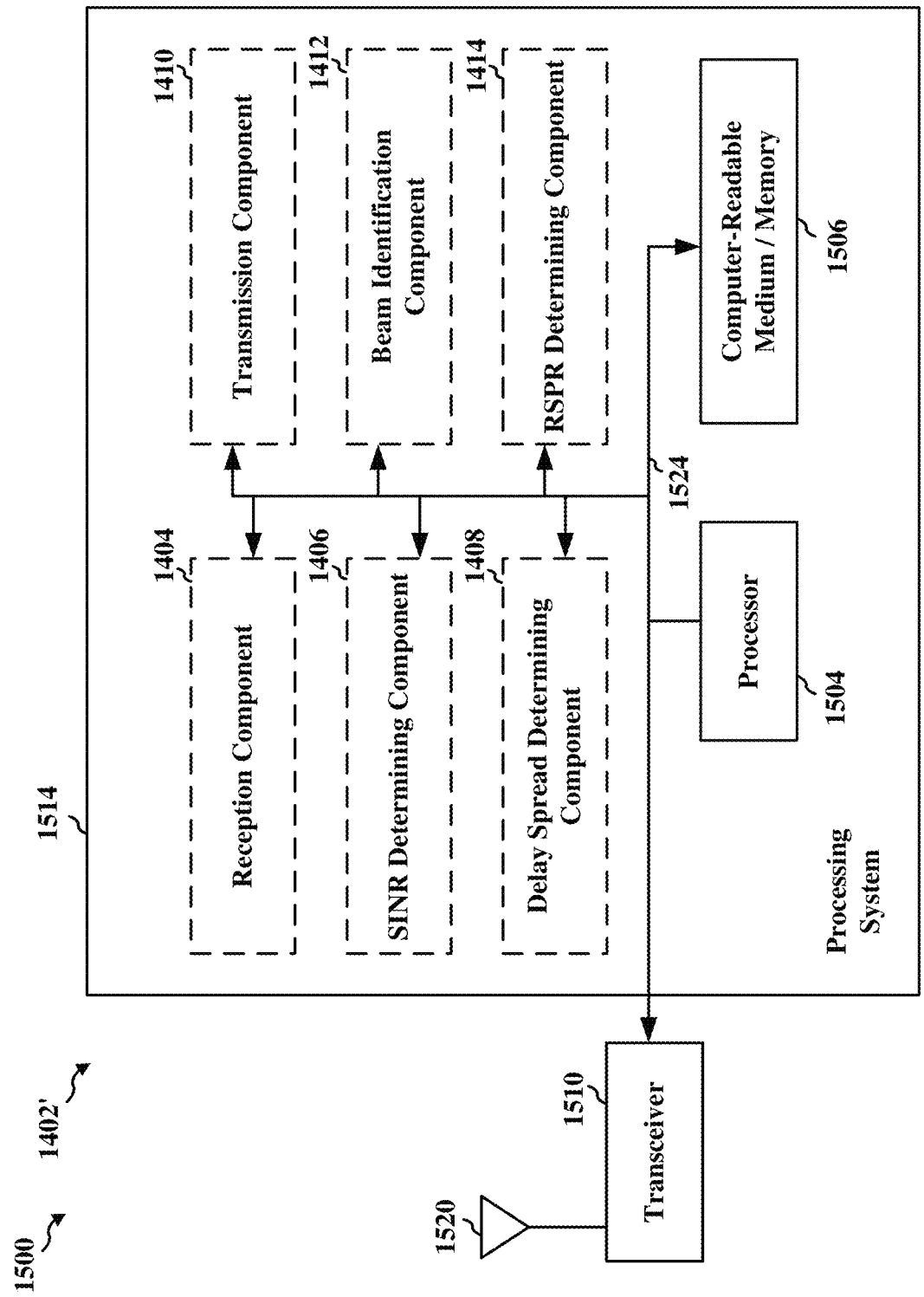
FIG. 15 shows a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, and 1414 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, and 1414. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for receiving a reference signal on each of a number of beams of a base station, means for determining a reference signal received power (RSRP) level and a delay spread value for each beam of the number of beams, means for transmitting an indication of the determined RSRP levels and the determined delay spread values to the base station, and means for receiving, in response to transmission of the determined RSRP levels and delay spread values, a selection of one of the number of beams to be allocated for DL transmissions to the UE. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In another configuration, the apparatus 1402/1402' for wireless communication includes means for receiving a reference signal on each of a number of beams of a base station, means for determining a delay spread value for each beam of the number of beams, means for identifying each beam of the number of beams for which the determined delay spread value is less than a threshold value, means for determining an RSRP level for each identified beam, means for transmitting an indication of the determined RSRP levels of the identified beams to the base station, and means for receiving, in response to the transmitted indication, a selection of one beam of the number of beams to be allocated for DL transmissions to the UE. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in another configuration, the aforementioned means may be the TX Processor 368, the RX Processor 356, and the controller/processor 359 configured to perform the functions recited by the aforementioned means.

In another configuration, the apparatus 1402/1402' for wireless communication includes means for receiving a reference signal on each of a number of beams of a base station, means for determining a signal-to-interference-plus-noise ratio (SINR) value for each beam of the number of beams, means for transmitting an indication of the determined SINR values to the base station, and means for receiving, in response to the transmitted indication, a selection of one of the number of beams to be allocated for DL transmissions with the UE. The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in another configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication performed by a user equipment (UE), comprising:
    receiving a reference signal on each of a number of beams associated with a base station;
    determining a delay spread value for each beam of the number of beams;
    identifying each beam of the number of beams for which the determined delay spread value is less than a threshold value;
    determining a reference signal received power (RSRP) level for each identified beam;
    transmitting an indication of the determined RSRP levels of the identified beams to the base station; and
    receiving, in response to the transmitted indication, a selection of one beam of the number of beams to be allocated for downlink (DL) transmissions to the UE, wherein the selection of the one beam is based at least in part on the determined RSRP levels of the identified beams.

2. The method of claim 1, further comprising:
    receiving DL data from the base station as a single-carrier transmission on the selected beam.

3. The method of claim 2, wherein the single-carrier transmission occupies a frequency sub-band in the millimeter-wave frequency spectrum.

4. The method of claim 1, wherein the indication of the determined RSRP levels of the identified beams is carried in one of an uplink control information (UCI) message or a medium access control (MAC) control element (MAC-CE).

5. The method of claim 1, wherein the reference signal comprises one of a channel state information reference signal (CSI-RS), a cell specific reference signal (CRS), a demodulation reference signal (DMRS), a beamforming reference signal (BRS), a beamforming measurement reference signal (MRS), or a sounding reference signal (SRS).

6. The method of claim 1, wherein the threshold value is based at least in part on capability information of an equalizer associated with the UE and configured to equalize channel delay spread of data transmissions received from the base station.

7. The method of claim 6, wherein the selection of the beam is further based on the capability information of the equalizer.

8. The method of claim 6, wherein the capability information indicates at least one of a number of available taps of the equalizer or whether the equalizer is a time-domain equalizer (TDE) or a frequency-domain equalizer (FDE).

9. The method of claim 1, further comprising:
    selecting one of a time-domain equalizer (TDE) or a frequency-domain equalizer (FDE) for equalizing channel delay spread of data transmissions received from the base station; and
    transmitting an indication of the selection of the TDE or the FDE to the base station.

10. The method of claim 9, wherein selecting the TDE or the FDE is based at least in part on one or more of a transmission bandwidth, a configured modulation and coding scheme (MCS), or a determination that the UE is to receive DL data from multiple transmit-reception points (TRPs).

11. The method of claim 1, wherein an indication of the threshold value is received in a radio resource control (RRC) configuration or a downlink control information (DCI) message.

12. A user equipment (UE) comprising:
    at least one modem;
    at least one processor communicatively coupled with the at least one modem; and
    at least one memory communicatively coupled with the at least one processor and storing instructions that, when executed by the at least one processor in conjunction with the at least one modem, causes the UE to perform operations comprising:
        receiving a reference signal on each of a number of beams associated with a base station;
        determining a delay spread value for each beam of the number of beams;
        identifying each beam of the number of beams for which the determined delay spread value is less than a threshold value;
        determining a reference signal received power (RSRP) level for each identified beam;

transmitting an indication of the determined RSRP levels of the identified beams to the base station; and receiving, in response to the transmitted indication, a selection of one beam of the number of beams to be allocated for downlink (DL) transmissions to the UE, wherein the selection of the one beam is based at least in part on the determined RSRP levels of the identified beams.

13. The UE of claim 12, wherein execution of the instructions causes the UE to perform operations further comprising:

receiving DL data from the base station as a single-carrier transmission on the selected beam.

14. The UE of claim 12, wherein the threshold value is based at least in part on capability information of an equalizer associated with the UE and configured to equalize channel delay spread of data transmissions received from the base station.

15. The UE of claim 14, wherein the selection of the beam is further based on the capability information of the equalizer.

16. The UE of claim 14, wherein the capability information indicates at least one of a number of available taps of the equalizer or whether the equalizer is a time-domain equalizer (TDE) or a frequency-domain equalizer (FDE).

17. The UE of claim 12, wherein execution of the instructions causes the UE to perform operations further comprising:

selecting one of a time-domain equalizer (TDE) or a frequency-domain equalizer (FDE) for equalizing channel delay spread of data transmissions received from the base station; and transmitting an indication of the selection of the TDE or the FDE to the base station.

* * * * *